United States Patent [19]
Diekelman

[11] Patent Number: 5,590,395
[45] Date of Patent: *Dec. 31, 1996

[54] SATELLITE CELLULAR NETWORK RESOURCE MANAGEMENT METHOD AND APPARATUS

[75] Inventor: Dennis P. Diekelman, Tempe, Ariz.

[73] Assignee: Motorola, Inc., Schaumburg, Ill.

[*] Notice: The term of this patent shall not extend beyond the expiration date of Pat. No. 5,555,444.

[21] Appl. No.: 150,702

[22] Filed: Nov. 10, 1993

[51] Int. Cl.$^6$ .................................................. H04B 7/185
[52] U.S. Cl. ........................ 455/13.1; 455/13.4; 455/33.1; 455/62
[58] Field of Search ................. 455/13.1, 13.2, 455/13.3, 13.4, 12.1, 33.1, 62, 67.1; 379/59

[56] References Cited

U.S. PATENT DOCUMENTS

| | | | |
|---|---|---|---|
| 4,335,426 | 6/1982 | Maxwell et al. | 364/200 |
| 5,031,089 | 7/1991 | Liu et al. | 364/200 |
| 5,042,027 | 8/1991 | Takase et al. | 370/60 |
| 5,099,235 | 3/1992 | Crookshanks | 455/13.1 |
| 5,109,380 | 4/1992 | Ogino | 371/15.1 |
| 5,123,017 | 6/1992 | Simpkins et al. | 371/15.1 |
| 5,227,802 | 7/1993 | Pullman et al. | 342/352 |
| 5,268,694 | 12/1993 | Jan et al. | 455/33.1 |
| 5,295,231 | 3/1994 | Ogino | 395/77 |

FOREIGN PATENT DOCUMENTS

| | | | |
|---|---|---|---|
| 0536921 | 4/1993 | European Pat. Off. | 455/13.1 |
| 8804495 | 6/1988 | WIPO | 455/13.1 |

OTHER PUBLICATIONS

Crosslink architectures for a Multiple Satellite System by Binder et al, IEEE vol. 75, No. 1, Jan. 1987.

*Primary Examiner*—Edward F. Urban
*Attorney, Agent, or Firm*—Sherry J. Whitney; Robert M. Handy

[57] ABSTRACT

A method for managing resource usage within a cellular communications system (10) having at least one satellite (12) and, capable of communicating with the satellite(s) (12), at least one controlling station (28) and multiple ground terminals (26). The controlling station (28) predicts (372, 380) system communication traffic and operating capabilities for a future period; generates (216) a system plan (250) and an individual operational plan (270-30n) for each satellite (12) based on the prediction; distributes (222) each individual operational plan (270-30n) to each corresponding satellite (12); monitors (226) execution of the system plan (250) during the future period to determine (228) whether the plan is operating acceptably and when the plan is not operating acceptably (228), generates (216) a new plan, or portion thereof, to alleviate the unacceptable operation; and repeats the foregoing steps for additional future periods. Each satellite (12) receives (502), stores (504), executes (224) and monitors execution (226) of its individual operational plan (270-30n) and transmits out-of-plan messages (338) to the controlling station (28) when it detects an out-of-plan condition (336).

73 Claims, 14 Drawing Sheets

SATELLITE CELLULAR NETWORK RESOURCE MANAGEMENT METHOD AND APPARATUS

CROSS-REFERENCE TO RELATED APPLICATIONS

This application is related to co-pending U.S. patent application Ser. No. 08/089,464 (IRI03082 Die), filed on Jul. 12 of 1993 entitled "Improved Communication Method and Apparatus", which is assigned to the same assignee as the present application.

FIELD OF THE INVENTION

The present invention relates generally to resource management in a distributed telecommunications system.

BACKGROUND OF THE INVENTION

A "resource" is defined herein as an element of a communication system which may be used directly or indirectly to support communication traffic. For example, electrical energy stored in a satellite battery, or channel capacity of a radio link are resources under this definition. The traffic carrying capacity of a communications system is limited because a finite quantity of resources exists within any system. For example, traffic demand and equipment power requirements (e.g., power for computers, satellite maneuvering energy, etc.) consume system resources.

In any system with limited resources, management of resource usage is desirable to achieve optimal system performance. Specifically, in a communication system containing satellites or other relatively inaccessible nodes that communicate with ground-based equipment, resource management is critical.

FIG. 1 illustrates a simplified diagram of satellite-based, cellular communications system 10, dispersed over and surrounding a celestial body (e.g., earth) through use of orbiting satellites 12.

Satellites 12 occupy orbits 14 that may be low-earth orbits, medium-earth orbits, geosynchronous orbits, or a combination thereof. Low-earth orbits are generally at an altitude of about 600 km to 2000 km, medium-earth orbits at about 2000 km to 20,000 km and geosynchronous orbits at about 42,165 km, but other altitudes can also be used. In the example shown, communications system 10 uses six polar orbit planes, with each orbit plane holding eleven satellites 12 for a total of sixty-six satellites 12. However, this is not essential and more or fewer satellites, or more or fewer orbit planes or combinations of orbiting and geosynchronous satellites, may be used. For clarity, FIG. 1 illustrates only a few of satellites 12.

Satellites 12 communicate with terrestrial equipment which may be any number of radiocommunication Subscriber Units 26, System Control Segment Ground Communication Stations 24 or Gateway Ground Communication Stations 30.

A "subscriber" is defined herein as a system user. FIG. 1 shows "Subscriber Unit" 26 (SU) which is an individual communication terminal which communicates directly with a satellite 12 via a radio link. SUs 26 may be hand-held, portable cellular telephones adapted to transmit subscriber data to and receive subscriber data from satellites 12. "Subscriber data" is defined herein as data (e.g., voice, paging, or fax data) originating from or terminating at a SU 26.

A "Ground Communication Station" (GCS) is defined herein as a terrestrial communication facility capable of interfacing ground based equipment (e.g., Gateway 22 or System Control Segment 28) with satellites 12. FIG. 1 shows Gateway GCS 30 (GW-GCS) associated with Gateway 22 and System Control Segment GCS 24 (SCS-GCS) associated with System Control Segment 28. SCS-GCSs 24 perform data transfer and telemetry, tracking, and control functions for the constellation of satellites 12. GW-GCSs 30 perform data transfer between satellites 12 and Gateways 22.

A "Gateway" 22 (GW) is defined herein as an equipment facility, typically ground-based, which is capable of interfacing GW-GCS 30 (and thus satellites 12) with ground-based equipment such as, for example, a public switched telephone network (PSTN), not shown. GWs 22 may perform call processing functions in conjunction with terrestrial telephony equipment (e.g., PSTN equipment) and satellites 12. GWs 22 communicate with the rest of communication system 10 via GW-GCSs 30. GWs 22 need not be co-located with GW-GCSs 30. GWs 22 are preferably coupled to GW-GCSs 30 via land-lines, although this is not essential. In an alternate embodiment, GWs 22 may be coupled to GW-GCSs 30 via fiber optic links, radio links or other transmission mediums.

A "System Control Segment" 28 (SCS) is defined herein as a control facility, typically ground-based, which controls operation of communication system 10. SCS 28 communicates with the rest of communication system 10 via SCS-GCS 24. SCS 28 need not be co-located with SCS-GCS 24. SCS 28 is preferably coupled to SCS-GCS 24 via land-lines, although this is not essential. In an alternate embodiment, SCS 28 may be coupled to SCS-GCS 24 via fiber optic links, radio links or other transmission mediums.

A "Ground Terminal" (GT) is defined herein as any communication facility (e.g., GW-GCS 30, SCS-GCS 24, SU 26, etc.), located on or near the surface of a celestial body (e.g., earth), which is capable of communicating directly with a satellite 12. Under this definition, SCS 28 and GW 22 are not GTs.

A "system node" is defined herein as a satellite 12, SU 26, GW 22, SCS 28, SCS-GCS 24 or GW-GCS 30. Only one each of GW 22, SCS 28, SU 26, SCS-GCS 24 and GW-GCS 30 is shown in FIG. 1 for clarity and ease of understanding. Those of skill in the art will understand based on the description herein that additional system nodes may be desirable, depending upon the needs of the communication system.

A "channel" is defined herein as a communication access opportunity (e.g., a Time Division Multiple Access (TDMA), Frequency Division Multiple Access (FDMA), or Code Division Multiple Access (CDMA) slot). A "link" is defined herein as a communication channel established between one system node and another system node, independent of what kind of communication access protocol is used. "System data" is defined herein as data necessary for control and operation of the system 10 (e.g., system control information, call setup data, signalling data etc.).

FIG. 2 illustrates communication links between several system nodes in communication system 10 (FIG. 1). SUs 26 exchange subscriber data with satellites 12 over radio links referred to hereinafter as "subscriber links" 40. Subscriber links 40 are generally low bandwidth channels that carry subscriber data. As used herein, the term "antenna" is intended to refer to any device for transmitting and/or receiving electromagnetic energy. Subscriber signals are desirably "brought up" into satellite 12 via dedicated, cellular subscriber antennas 42 on board satellite 12 which projects onto the surface of the celestial body a pattern of "cells" 44 within which SU 26 must be located in order for communications to occur between SU 26 and subscriber antennas 42. Each cell 44 is assigned sets of subscriber channels which will not interfere with subscriber channels of surrounding cells. In the preferred embodiment, each subscriber channel may be multiplexed (e.g., TDMA, FDMA, CDMA, etc., or a combination thereof) to allow multiple users to communicate using a single subscriber channel. In an alternate embodiment, the subscriber channels may not be multiplexed.

An "up/down link" is defined herein as a radio channel between a ground based communication facility (e.g., SCS-GCS 24 or GW-GCS 30) and a satellite 12. Satellites 12 exchange data with GW-GCSs 30 and SCS-GCSs 24 via two types of up/down links: "feeder links" 46 and "control links" 48. Feeder links 46 between satellites 12 and GW-GCSs 30 carry system data and subscriber data. Control links 48 between satellites 12 and SCS-GCSs 24 generally carry only system data. Feeder 46 and control 48 links desirably use dedicated satellite down-link antennas 50, GW-GCS up-link antennas 52 at GW-GCS 30 and SCS-GCS up-link antennas 54 at SCS-GCS 24.

An "up-link" is defined herein as a link from a GW-GCS 30 or SCS-GCS 24 to a satellite 12. A "down-link" is defined herein as a link from a satellite 12 to a GW-GCS 30 or SCS-GCS 24.

A "cross-link" is defined herein as a radio channel between one orbiting satellite and an orbiting neighbor satellite. "Neighbor satellites" are defined herein as satellites 12 that are capable of establishing direct communications with each other. "Non-neighbor satellites" are defined herein as satellites 12 that are not capable of establishing direct communications with each other (e.g., due to range limitations, interference restrictions, or geographical barriers). Satellites 12 exchange data with neighbor satellites 12 via cross-links 56, although satellites 12 may also exchange data with non-neighbor satellites. Cross-links 56 carry system data and subscriber data. Subscriber data from SUs 26 are converted into cross-link signals within satellites 12 when the subscriber data must be communicated to another satellite 12 or to GW-GCS 30. Cross-link antennas 58 on board satellites 12 are desirably used to transmit and receive signals directly from other satellites 12. If simultaneous communication is desired with multiple satellites 12, multiple cross-link antennas 58 may be used. Referring to FIG. 1, satellite 12 communicates "fore" with another satellite 12 leading it within the same orbit plane and communicates "aft" with another satellite 12 following it. Also as herein defined, satellite 12 communicates "left" or "right" with other satellites 12 in an adjacent orbit plane, depending on which adjacent plane the other satellite 12 is located in. "Left", "right", "fore", and "aft" are defined as if the observer was riding on the satellite 12 facing in the direction of the satellite motion.

In a classical "bent pipe" communication system of the prior art, satellites 12 do not communicate directly with other satellites 12 over cross-links 56 (FIG. 2). Instead, signals from one satellite 12 are sent on relay links 60 to relay 62. Relay 62 may then communicate the data in the signals to land-based radio or land-line equipment, or transmit it up to another satellite 12 or to another node on relay ground-links 64. Relay 62 may be earth-based, airborne, or space-based as long as it is within sight of the transceiving satellites. Another feature of the typical "bent pipe" system is that the satellites 12 do little more than receive signals on one frequency and transmit them on another, independent of the origin or destination of the signals, i.e., no information processing takes place in the "bent pipe" satellite transponder.

For successful operation of communication system 10, management of each system node's finite resources is necessary to maximize system efficiency. For example, communication system 10 should not allow a busy metropolitan area (e.g., Tokyo) to consume all the stored energy on board a satellite that will be needed, say, thirty minutes later to support another busy metropolitan area (e.g., New York City). Stored energy on-board a satellite 12 is typically limited by the ability of the satellite's solar collectors to convert solar flux into electrical energy, and by the ability of the satellite's batteries to store the converted solar energy. Thus, the state of charge or amount of energy stored in the satellite's batteries is an important physical constraint which must be managed.

Satellite antennas 42, 50, 58 are also limited resources. Because a finite number of antennas exist on-board a satellite 12, the number of ground terminals 26, 24, 30, 62 and other satellites 12 that may communicate to or through the satellite 12 is limited by the number of antennas 42, 50, 58. For a cellular satellite communication system, the number of subscriber cells 44 per antenna 42 and the number of subscriber channels per cell define additional resource limitations.

In addition to physical resources of a space-based communication system, operating restrictions also affect resource usage. Operating restrictions may be interference, licensing and spectrum restrictions. For example, a satellite 12 may be required to turn off some of its cells 44 while passing over a particular location on the earth to avoid interfering with sensitive ground-based equipment (e.g., radio-astronomy receivers).

Resource management is critical in a space-based communication system because the resources are severely limited and are often not easy to increase or replenish due to the remote nature of the satellites 12.

Prior methods of resource management of a satellite system entail manual creation of rule sets that are turned into decision trees defining control room procedures for humans to follow when particular events or states occur within the system.

Because the rule sets and decision trees are manually created, and operation of the system requires humans to collect system information and react to it in accordance with the control room procedures, a large staff is typically needed to operate a satellite system.

One disadvantage to using human staffs is increased cost of operating a system. In general, a more cost effective solution to system management is to employ automated processes rather than humans.

Another disadvantage to using humans in the decision making process is that response times to system events are slow. Slow response times may have detrimental effects. For example, if a satellite reports that it (or another remotely located node) is running dangerously low on stored energy, a human operator must receive the information and determine what course of action to take to alleviate the problem (including analyzing the effects on the rest of the system), gain the required approval to take such action, and implement the change. Meanwhile, if the satellite runs too low on stored energy, its on-board sub-systems may drop off line and the whole satellite may enter a survival mode or become inoperative, during which time the affected satellite is unable to support subscriber traffic. In a single coverage system (i.e., many points on the surface of the earth are serviced by only one satellite at a time), this is particularly critical. While the affected satellite is off line, all traffic being supported by that satellite is dropped. The affected satellite will cause all subscriber calls and control and feeder links to terminate everywhere in its path. This represents service degradation and damage to the reputation of the system. If the satellite is permanently taken off line, weeks of delay may result while the satellite is replaced.

Because prior art resource management is performed predominantly by humans, the limits of human efficiency set boundaries on the efficiency of resource management, and the size and complexity of satellite systems which can be effectively controlled. The problem worsens as the complexity of a satellite system increases because the amount of dynamic system resources also increases.

With rapidly advancing communications technologies, larger and more complex space-based communication systems are desirable. Because a large and complex space-based communication system cannot be efficiently managed using predominantly human staffs, an adaptive network resource management function is desired which allows rapid and accurate management of a communication system's physical resources. The ability to rapidly replan resource usage when unanticipated emergency or out-of-tolerance situations occur minimizes system down-time and maximizes system efficiency and customer satisfaction.

Therefore, computationally efficient methods are needed to rapidly manage resources of a satellite cellular communication system.

Further, in order for the system to be able to respond to service requirement changes in real time, it is desirable that resource analysis and management be as automated as is possible. Automated management is especially desirable to allow rapid planning of limited resource usage of a constellation of communications satellites and associated ground stations.

SUMMARY OF THE INVENTION

The advantages of the present invention are carried out in one form by an improved method for operating a satellite cellular communication system having multiple satellites, at least some of which are moving with respect to a surface of a celestial body, wherein each satellite contains transmitters and receivers, and where the whole system contains multiple ground terminals and at least one controlling station. The present invention comprises the steps of a) forecasting by a first computer the communication traffic expected to pass between ground terminals and satellites and the operating capabilities of the satellites, during a future predetermined period, b) determining from the forecasted traffic and satellite operating capabilities, an individual operational plan for each satellite suitable to acceptably accommodate the forecasted traffic during the predetermined period, c) transmitting to and storing within each satellite the individual operational plan for such satellite, and d) energizing transmitters and receivers of the satellites according to the stored individual operational plans in response to actual traffic demands during the predetermined period.

An apparatus for enacting the improved method for operating a satellite cellular communication system is a cellular communication system comprising one or more controlling stations, one or more ground terminals, and multiple satellites, at least some of which are moving with respect to a celestial body. Each satellite contains one or more transmitters and receivers for providing communication between each other, and at least one down-link antenna coupled to the one or more transmitters and receivers. One of the at least one down-link antennas is a cellular antenna for projecting subscriber cells onto the celestial body's surface. Each satellite also contains satellite resident memory having an operational plan provided to the satellites by one of the one or more controlling stations. The operational plan is for operating the satellite for a predetermined future period. The operational plan causes the satellite to change its mode of operation at predetermined times during the predetermined period. Each satellite also comprises a satellite resident controller coupled to the satellite resident memory and the one or more transmitters and receivers. The satellite resident controller is for actuating the one or more transmitters and receivers in accordance with communication traffic passing through the satellites in a manner determined by a satellite operational plan stored in the satellite resident memory.

The one or more controlling stations forecast communication traffic expected to pass between the satellites and between the satellites and the ground terminals. The one or more controlling stations also forecast the operating capabilities of the satellites during a future predetermined period. The one or more controlling stations generate the operational plan for each particular satellite. The operational plan is suitable to acceptably accommodate the forecasted traffic for a particular satellite during the predetermined period within the constraints imposed by the operational capabilities of the particular satellite. The system also comprises transmitters associated with the one or more controlling stations for transmitting the operational plan to each particular satellite for storage in the satellite resident memory.

BRIEF DESCRIPTION OF THE DRAWING

The invention is pointed out with particularity in the appended claims. However, a more complete understanding of the present invention may be derived by referring to the detailed description and claims when considered in connection with the figures, wherein:

The exemplification set out herein illustrates a preferred embodiment of the invention in one form thereof and such exemplification is not intended to be construed as limiting in any manner.

DETAILED DESCRIPTION OF THE PREFERRED EMBODIMENT

Figure 3:
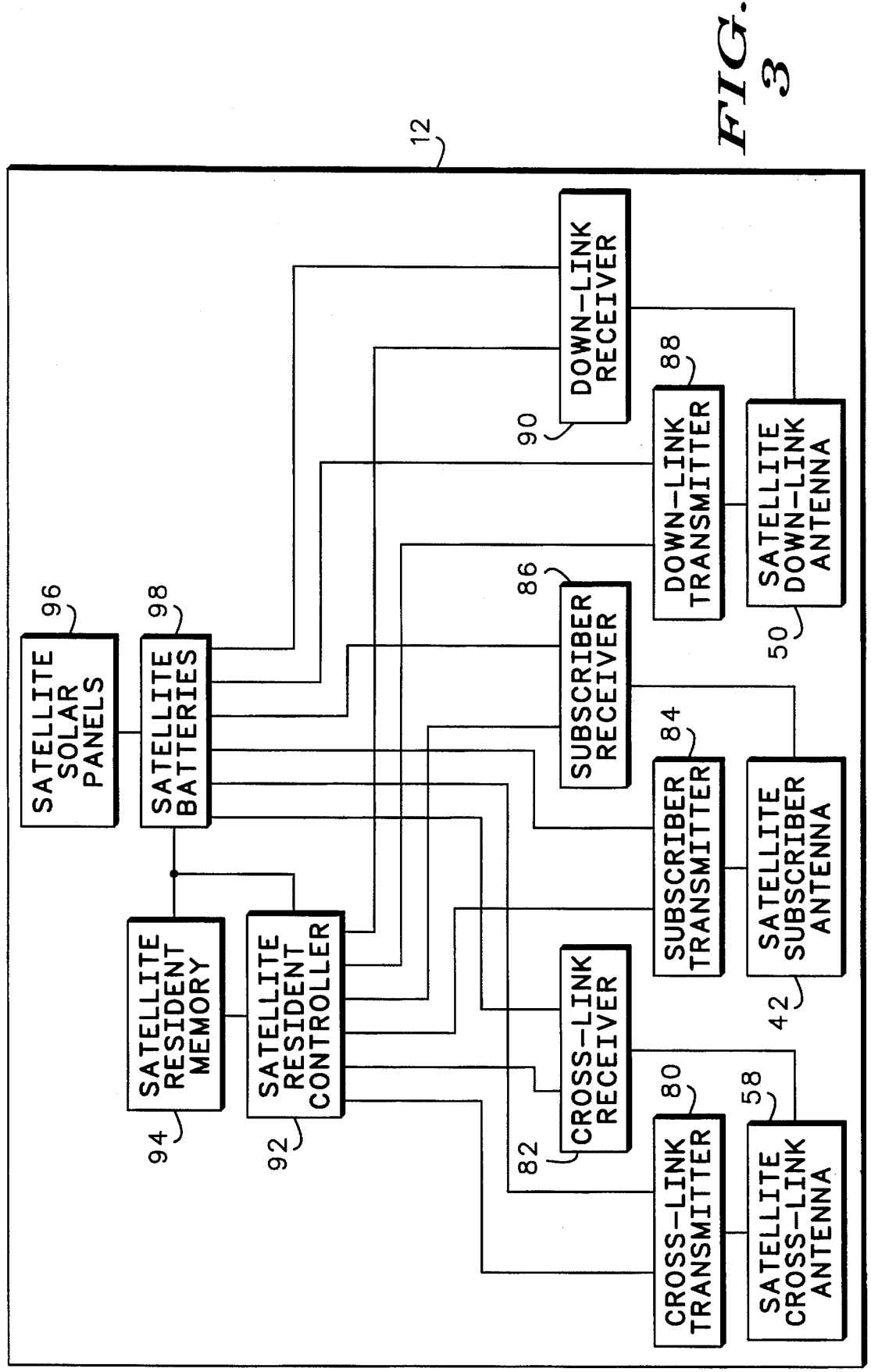
FIG. 3 shows a layout diagram of a satellite in accordance with the present invention.

FIG. 3 illustrates a preferred embodiment of satellite 12. Satellite 12 desirably includes cross-link antennas 58, down-link antennas 50, subscriber antennas 42. Cross-link antennas 58 are coupled to cross-link transmitter 80 and cross-link receiver 82. Subscriber antennas 42 are coupled to subscriber transmitter 84 and subscriber receiver 86. Down-link antennas 50 are coupled to down-link transmitter 88 and down-link receiver 90. Transmitters 80, 84, 88 and receivers 82, 86, 90 are all coupled to satellite resident controller 92, which is coupled to satellite resident memory 94. Satellite 12 also includes, for example, satellite solar panels 96 coupled to satellite batteries 98, which are coupled to and provide electrical energy to satellite resident memory 94, satellite resident controller 92, transmitters 80, 84, 88 and receivers 82, 86, 90. A system operational plan is conveniently received by satellite 12 through down-link antenna 50 and down-link receiver 90, and is stored in satellite resident memory 94 by satellite resident controller 92. The system operational plan is described in more detail later.

Satellite resident controller 92 controls real-time operation of satellite 12 in accordance with the stored operational plan. This partially entails controlling the communication traffic on, and the orientations of, cross-link antennas 58, subscriber antennas 42 and down-link antennas 50. Satellite resident controller 92 also monitors stored energy in satellite batteries 98, and controls consumption of the stored energy in accordance with the operational plan. The stored energy in the satellite batteries 98 is replenished by conversion of solar flux into electrical energy by the satellite solar panels 96. While solar panels are described as being the primary electrical energy source, other sources can also be used. Non-limiting examples are fuel cells and nuclear powered reactors.

Figure 1:
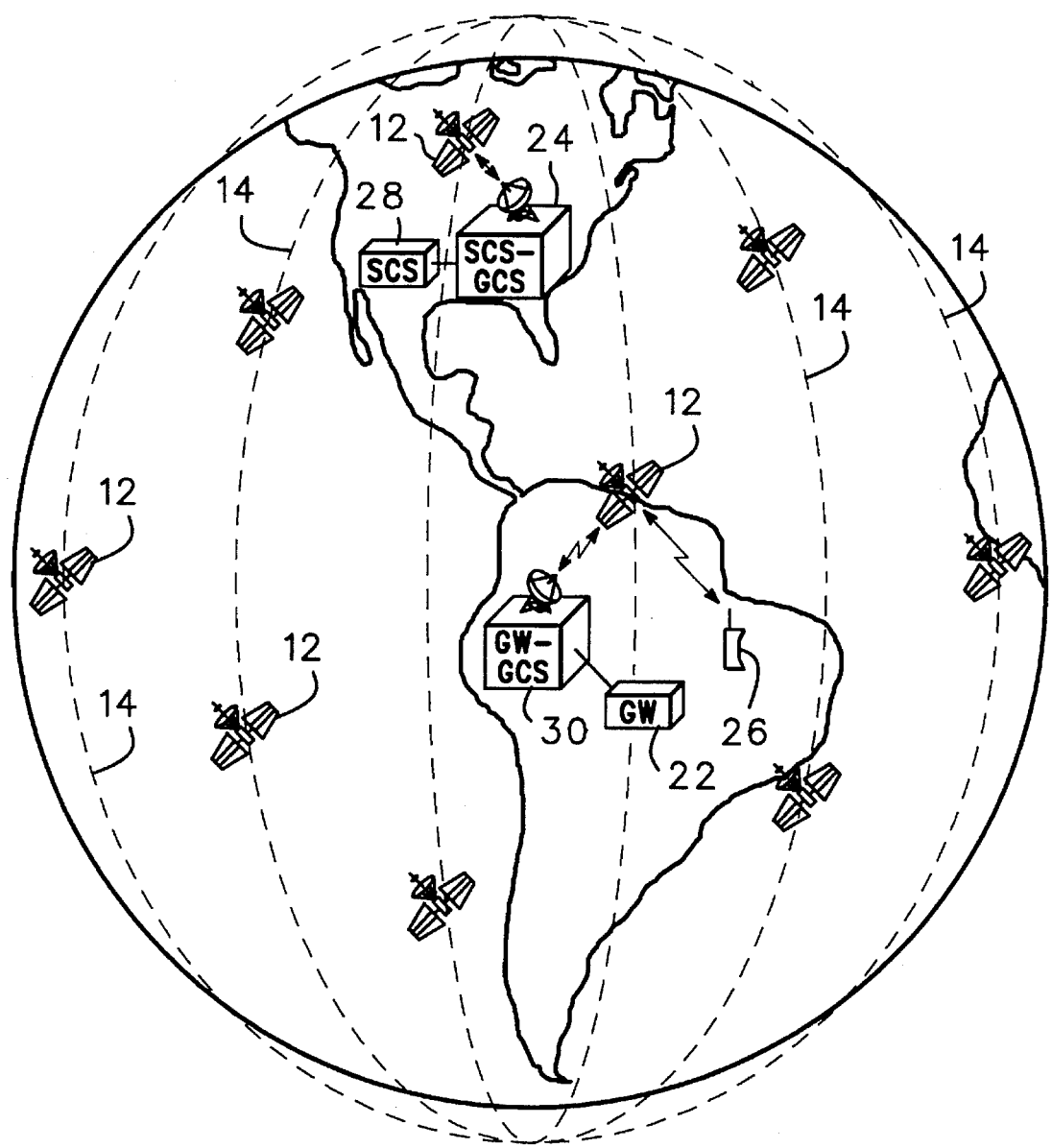
FIG. 1 shows an illustrative satellite-based cellular communication system in schematic form.
Figure 4:
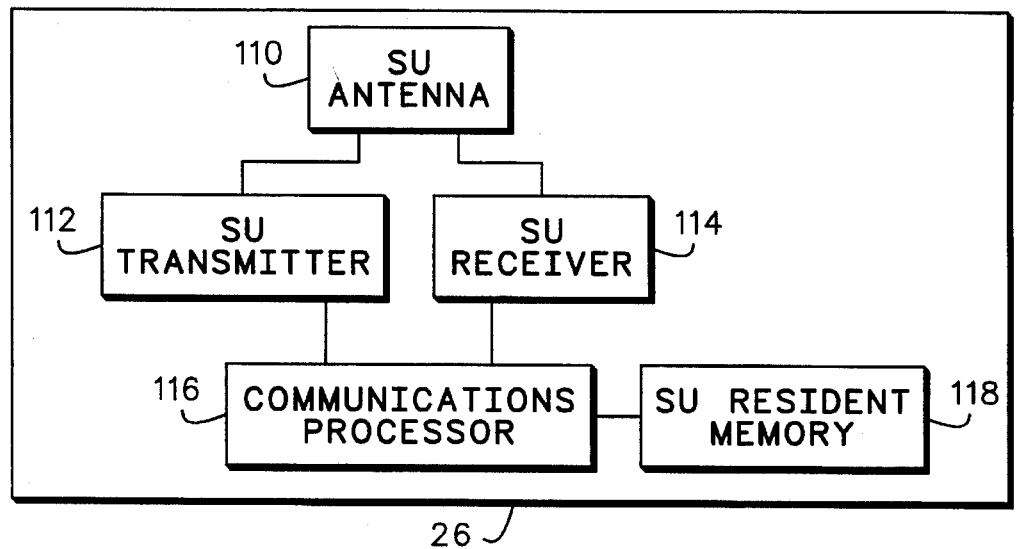
FIG. 4 shows a layout diagram of a subscriber unit in accordance with the present invention.

FIG. 4 illustrates a preferred embodiment of SU 26. SU 26 desirably includes SU antennas 110, coupled to SU transmitter 112 and SU receiver 114, which are in turn coupled to communications processor 116. Communications processor 116 is coupled to SU resident memory 118. Communications processor 116 controls and manipulates data (e.g., voice data) communicated to and from SU 26. Part of the communications processor's control task is to evaluate whether SU 26 may make a "call" on communication system 10 (FIG. 1), and if SU 26 may make a call, what communication channels SU 26 may use. This evaluation depends on access and channel information broadcast by a satellite 12 (FIG. 1) which is received by SU 26 through SU receiver 114. This access and channel information is contained within the operational plan which is stored in the satellite's resident memory 94 (FIG. 3) prior to broadcast of the access and channel information by the satellite 12 (FIG. 1). SU 26 transmits and receives subscriber data and system data through SU transmitter 112 and SU receiver 114, respectively.

Figure 5:
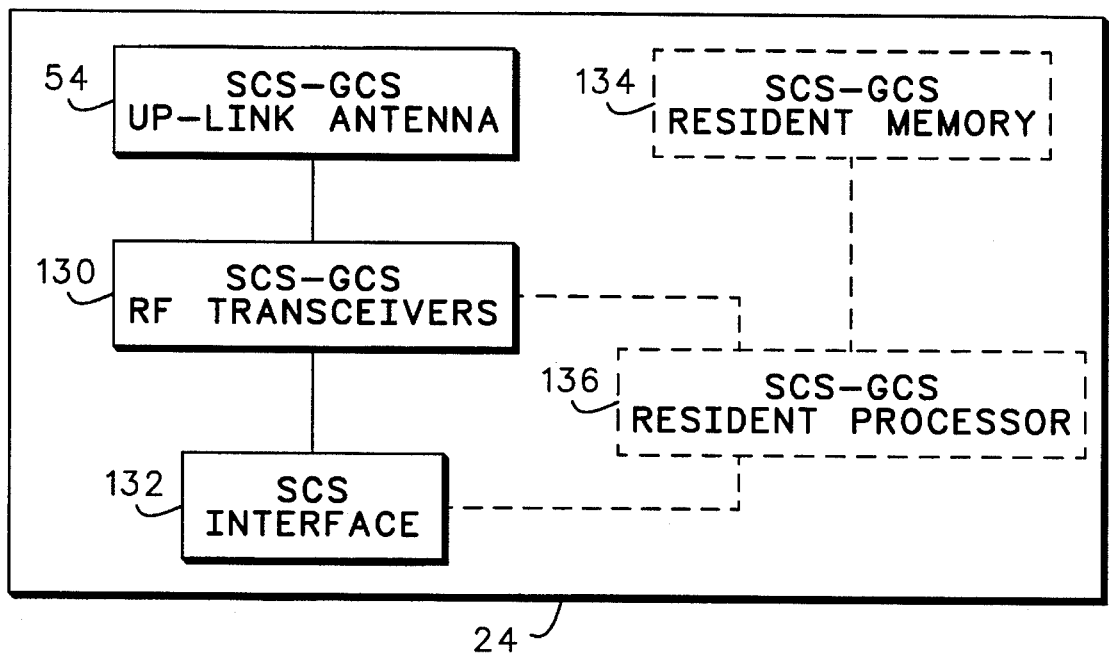
FIG. 5 shows a layout diagram of a system control segment ground control station in accordance with the present invention.

FIG. 5 illustrates a preferred embodiment of SCS-GCSs 24 which includes SCS-GCS up-link antennas 54 coupled to SCS-GCS RF transceivers 130, which are coupled in turn to SCS interface 132. In an alternate embodiment, SCS-GCS 24 may additionally include SCS-GCS resident memory 134 coupled to SCS-GCS resident processor 136, which is desirably coupled between SCS-GCS RF transceivers 130 and SCS interface 132. SCS 28 (FIG. 1) sends operational plans to SCS-GCS 24 via the SCS interface 132. SCS-GCS 24 then transmits the operational plans to system nodes such as satellites 12 (FIG. 1) via SCS-GCS up-link antenna 54. SCS-GCS 24 also receives telemetry information from other system nodes and sends that information to SCS 28 (FIG. 1) via SCS interface 132.

Figure 6:
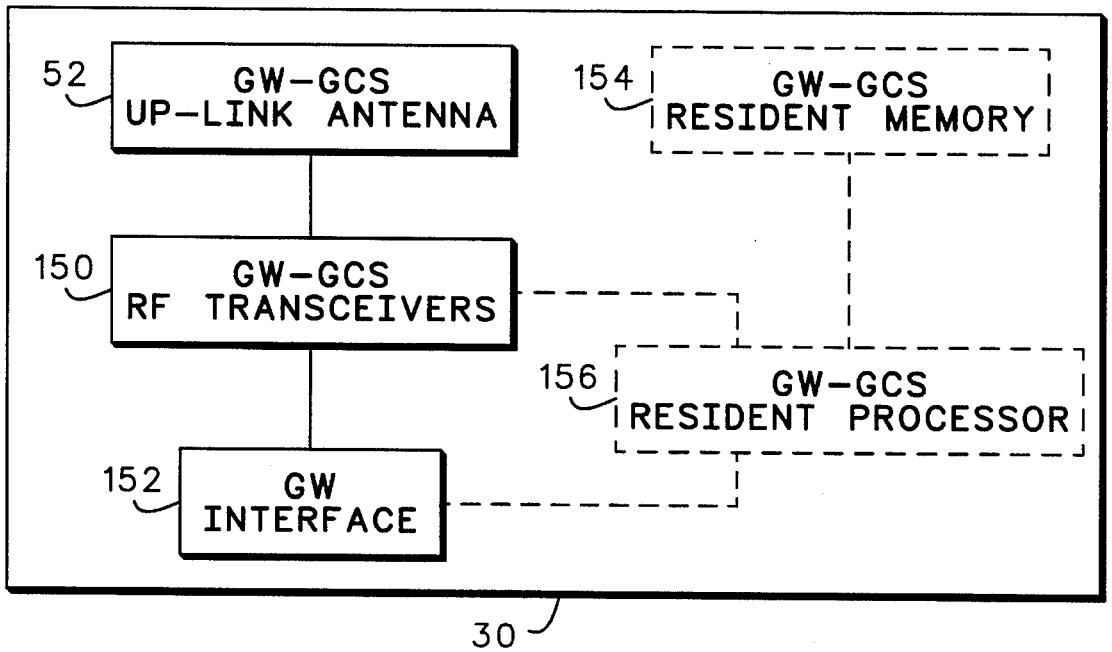
FIG. 6 shows a layout diagram of a gateway ground control station in accordance with the present invention.

FIG. 6 illustrates a preferred embodiment of Gateway GCS 30 (GW-GCS) which includes GW-GCS up-link antennas 52 coupled to GW-GCS RF transceivers 150 coupled in turn to GW interface 152. In an alternate embodiment, GW-GCS 30 may additionally include GW-GCS resident memory 154 coupled to GW-GCS resident processor 156 which is desirably coupled between GW-GCS RF transceivers 150 and GW interface 152. GW-GCS 30 communicates with GW 22 (FIG. 1) via GW interface 152. GW-GCS 24 communicates with satellites 12 (FIG. 1) via GW-GCS up-link antennas 52.

Figure 7:
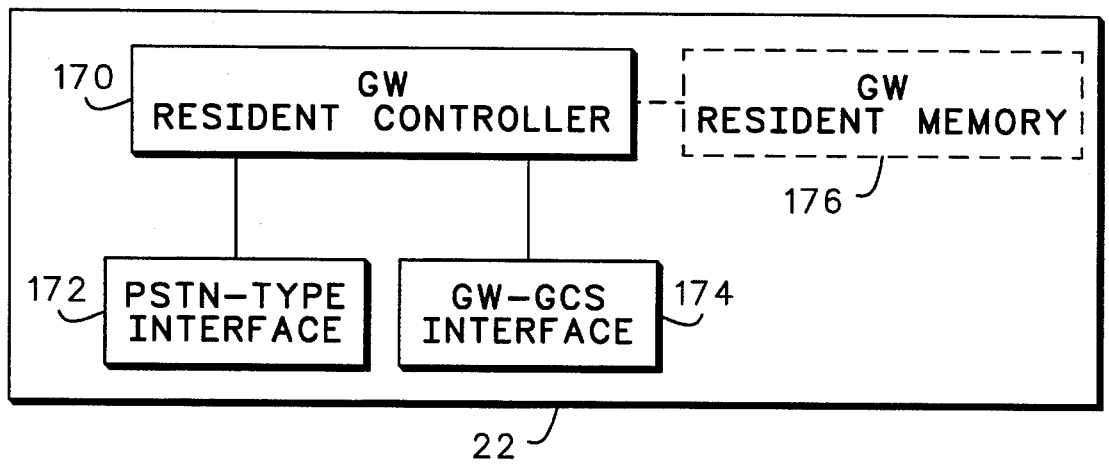
FIG. 7 shows a layout diagram of a gateway in accordance with the present invention.

FIG. 7 illustrates a preferred embodiment of GW 22. GW 22 desirably includes GW resident controller 170 coupled to PSTN-type interface 172. PSTN-type interface 172 may connect GW 22 to a PSTN, an International Switching Center or other network, based on the requirements of the particular communications system. GW resident controller 170 is also coupled to GW-GCS interface 174. GW 22 communicates with the rest of the system via GW-GCS interface 174. In an alternate embodiment, GW 22 may additionally include GW resident memory 176.

Figure 8:
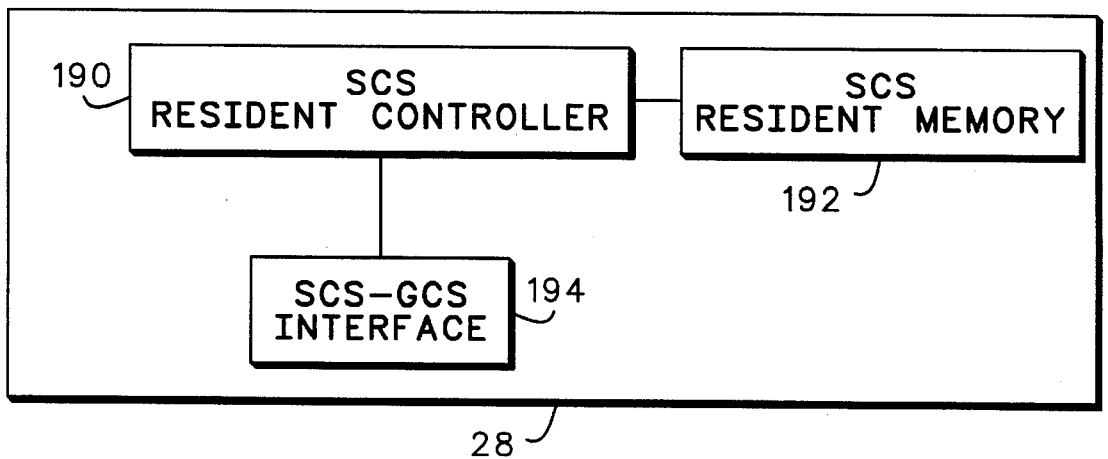
FIG. 8 shows a layout diagram of a system control segment in accordance with the present invention.

FIG. 8 illustrates a preferred embodiment of SCS 28. SCS 28 desirably includes SCS resident controller 190 coupled to SCS resident memory 192. SCS resident controller 190 is also coupled to SCS-GCS interface 194. In the preferred embodiment, SCS resident controller 190 generates the system operational plan which controls resource usage of the system nodes of communication system 10 (FIG. 1). SCS resident controller 190 uses information stored in SCS resident memory 192 during generation of the system operational plan. The system operational plan is communicated to the rest of the system through SCS-GCS interface 194 which transmits the operational plan to a SCS-GCS 24 (FIG. 1). SCS-GCS interface 194 also receives data from SCS-GCS 24 (FIG. 1).

1. Resources of a Space-based Communications System

Space-based telecommunications systems present special problems not ordinarily encountered in terrestrial telecommunications systems. The satellites within a space-based communication system have the most limited resources. Size and weight constraints limit the quantity of resources which the satellite may contain at launch. And due to the remote nature of satellites, resource replenishment from an outside source is impractical or very limited. Limited satellite resources include:

down-link 50 (FIG. 3), cross-link 58 (FIG. 3) and subscriber antennas 42 (FIG. 3), capacities of cross-links 56 (FIG. 2), and control-links 48, and relay links 60 (FIG. 2), number of active cells 44 (FIG. 2) per subscriber antenna 42 (FIG. 3), number of active subscriber channels per cell 44 (FIG. 2), and availability of stored electrical energy over time.

Ground based communication equipment resources are less limited than satellite resources because they are easier to increase or replenish. They are generally limited by economic factors rather than physical factors.

2. Functions of the Network Resource Manager

As used herein, the term "system plan" refers to a master system plan which determines how system resources will be used during a predetermined planning period. A "sub-plan" refers herein to that portion of a system plan that allocates use of a specific type of resource (e.g., a cell activation sub-plan 260, FIG. 10) on the system level. The term "individual plan table" refers herein to an individual system node's unique portion of a system sub-plan (e.g., NODE 1 cell activation tables 1051, FIG. 10). A "set of individual plan tables" refers herein to all individual plan tables derived from relevant system sub-plans that are unique to a particular node (e.g., NODE 1 set 310, FIG. 10). The term "planning period" is defined herein as a predetermined period of time (e.g., 24 hours) for which a system plan is developed.

The Network Resource Manager (NRM) is an automated system and method for managing the resources of a communication system while globally accommodating system traffic. The NRM performs five major functions:

a. predicts the demand for system service during a future period based on historical traffic data;

b. generates a system plan to meet predicted service requirements as well as possible during the future period, given available system resources and system contractual requirements;

c. determines and distributes each system node's unique portion of the system plan to each system node;

d. monitors execution of the system plan, including health and status of the system nodes; and e. takes corrective action when the system is or will soon be operating outside allowable thresholds.

How the NRM performs its five major functions is explained in detail in this description.

Prior art resource management systems are generally demand-driven, real-time response systems. Demand-driven, real-time response systems react in real time to demand events occurring in real time. Generally, they are not predictive. That is, they deal as best they can with what is happening at the current moment rather than acting in accordance with a predetermined plan which is based on history and predictions of events yet to come.

The NRM of the present invention is different from other resource management applications in that it is a predictive system, rather than merely a demand driven system. For example, the NRM may predict what tomorrow's system traffic will be and then create a system plan indicating how each system node should use its resources to support tomorrow's traffic. The system plan contains upper bounds which system nodes cannot exceed during actual operation. In other words, the system nodes must live within the bounds of the allocation even if tomorrow's traffic is much heavier than predicted.

The NRM is also different from prior art resource management systems and methods because the environment in which a space-based communication system operates is fundamentally different from environments of conventional prior art resource management systems, as for example, the environment associated with prior art resource managers used for assembly line optimization. In a space-based communication system, each system node's resources are dynamic and change by the moment as a function of changing traffic demands, movement of the earth, sun, satellites, etc. Accordingly, each system node may have a completely different set of rules and constraints from every other system node, and the overall state of the system may never repeat. For example, by the time the next planning period occurs, the capabilities of each system node may be quite different from the capabilities which that same system node had at the beginning of the current planning period.

Figure 9:
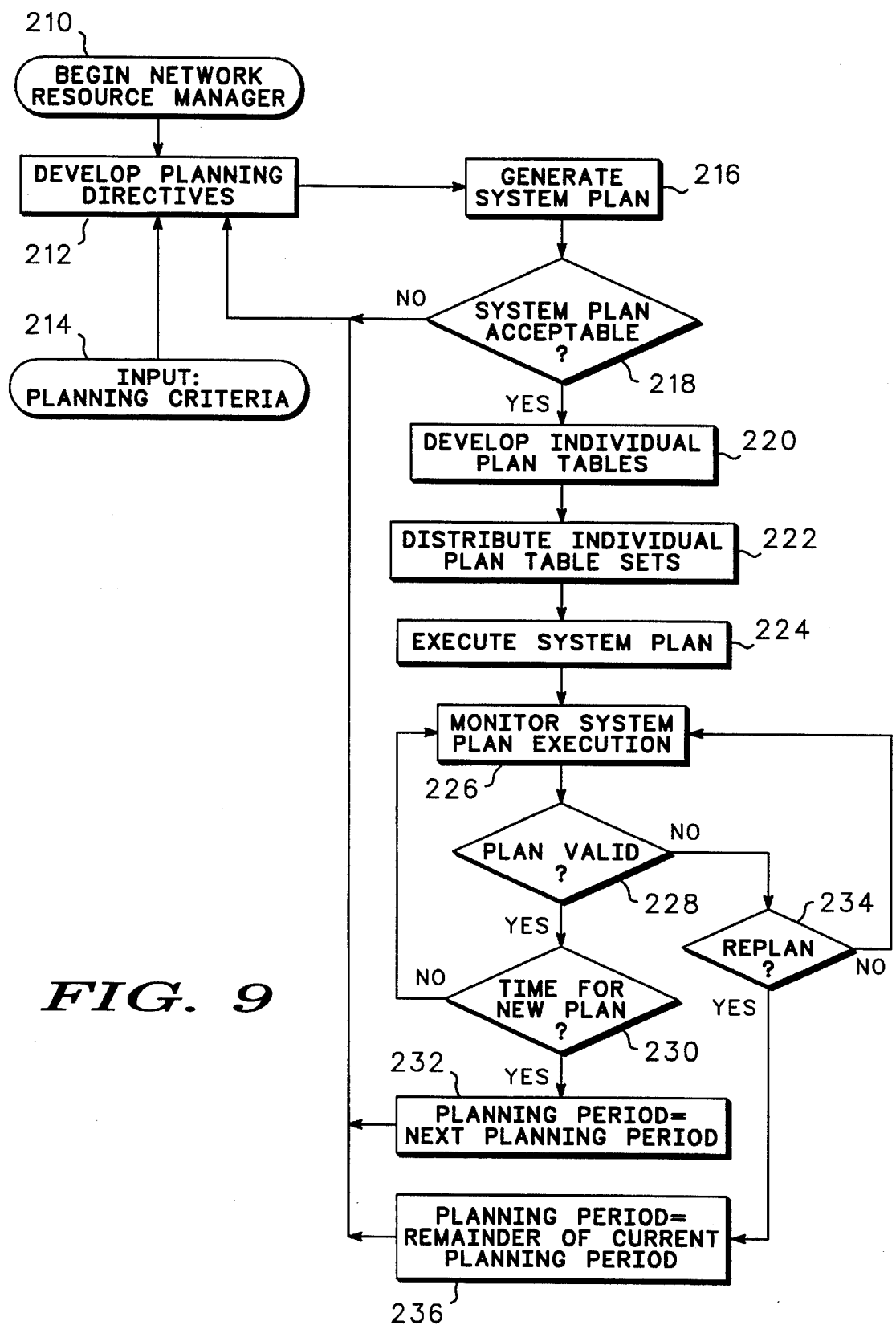
FIG. 9 illustrates a flow chart of a method for managing network resources in accordance with the present invention.

FIG. 9 shows a flowchart illustrating the operation of the NRM. The NRM processing is desirably carried out within SCS 28 (FIG. 8), except the Execute System Plan function (block 224) which is desirably carried out within the individual system nodes. The NRM begins (block 210) by performing the Develop Planning Directives process (block 212). The Develop Planning Directives process (block 212) converts high level planning criteria (block 214) into low level planning directives. For example, planning criteria (block 214) may represent system contractual commitments (e.g., a contractual requirement which specifies allowable "outage minutes" (minutes of service interruption) for a quarter of a year) or responses to system conditions (e.g., reduce capacity on a particular satellite due to degraded energy capacity). The outputs of the Develop Planning Directives process (block 212) are planning directives. Planning directives are low level instructions provided to the Generate System Plan process (block 216) which influence generation of a system plan. For example, a planning directive may tell the Generate System Plan process (block 216) to minimize usage of cells on a particular satellite.

After the Develop Planning Directives process (block 212) is performed, the Generate System Plan process (block 216) produces a system plan for the specified planning period. The system plan may be thought of as a large "matrix" in which resource usage of all system nodes is balanced at the system level. The system plan desirably includes system "sub-plans" which are plans for using each type of system resource (e.g., node-to-node routing sub-plan 256, FIG. 10, access priority sub-plan 258, FIG. 10, cell activation sub-plan 260, FIG. 10, or up-link assignment sub-plan 262, FIG. 10). The system plan contains directives for each system node to follow during plan execution (e.g., which direction a satellite should route data on its cross-links, which access priorities are being serviced by a cell, when to turn certain cells on or off, which antennas are assigned for an up-link, and so forth). The system plan also includes "thresholds" of resource usage which system nodes may not exceed during execution of the system plan (e.g., maximum number of calls the system node may handle at a certain time).

The system plan may not satisfy all predicted service demands. Thus, the Generate System Plan process (block 216) also creates "metrics" which describe how well the system plan converged with the predicted system service demands. These metrics originate from the Generate Cell Activation Metrics process (block 420, FIG. 12), and the Balance Link Loads process (block 482, FIG. 14) which are described later. The metrics are evaluated as part of the determination whether the system plan is acceptable (block 218, FIG. 3). The Generate System Plan process (block 216) is described further in section A below.

Using the metrics from the Generate System Plan process (block 216), the system plan is evaluated and a determination is made (block 218) whether the system plan is acceptable. If it is determined that the system plan met all contractual system performance requirements, the system plan may be considered acceptable. If not, the evaluation considers whether any of the planning criteria (block 214) could be altered to improve system performance (e.g., to better meet contractual requirements), or whether the system plan is the best the system can do given the resources available during the planning period with the forecasted demand. Even if all contractual requirements are not met, a system plan may be considered acceptable when the NRM determines that the projected system performance is the best the system can do given the available resources.

If the planning criteria (block 214) can be altered to improve system performance, the system plan is not considered acceptable (block 218). At that time, the planning criteria are altered and Develop Planning Directives (block 212) is invoked to develop revised planning directives. Generate System Plan (block 216) then creates another system plan and the procedure iterates as shown in FIG. 9.

When a system plan is considered acceptable (block 218), the Develop Individual Plan Tables process (block 220) is invoked to derive entries unique to each individual system node from the system plan. Individual plan tables (e.g., NODE 1 cell activation tables 1051, FIG. 10) are created for each system node from each system sub-plan (e.g., cell activation sub-plan 260, FIG. 10). All individual plan tables for a particular system node are compiled into a "set of individual plan tables" (e.g., NODE 1 set 310, FIG. 10) which collectively represents that system node's unique portion of the system plan. The number of individual plan tables within a set may vary depending on which resources need to be managed within that particular system node. Develop Individual Plan Tables (block 220) is described in further detail in section B below.

Figure 10:
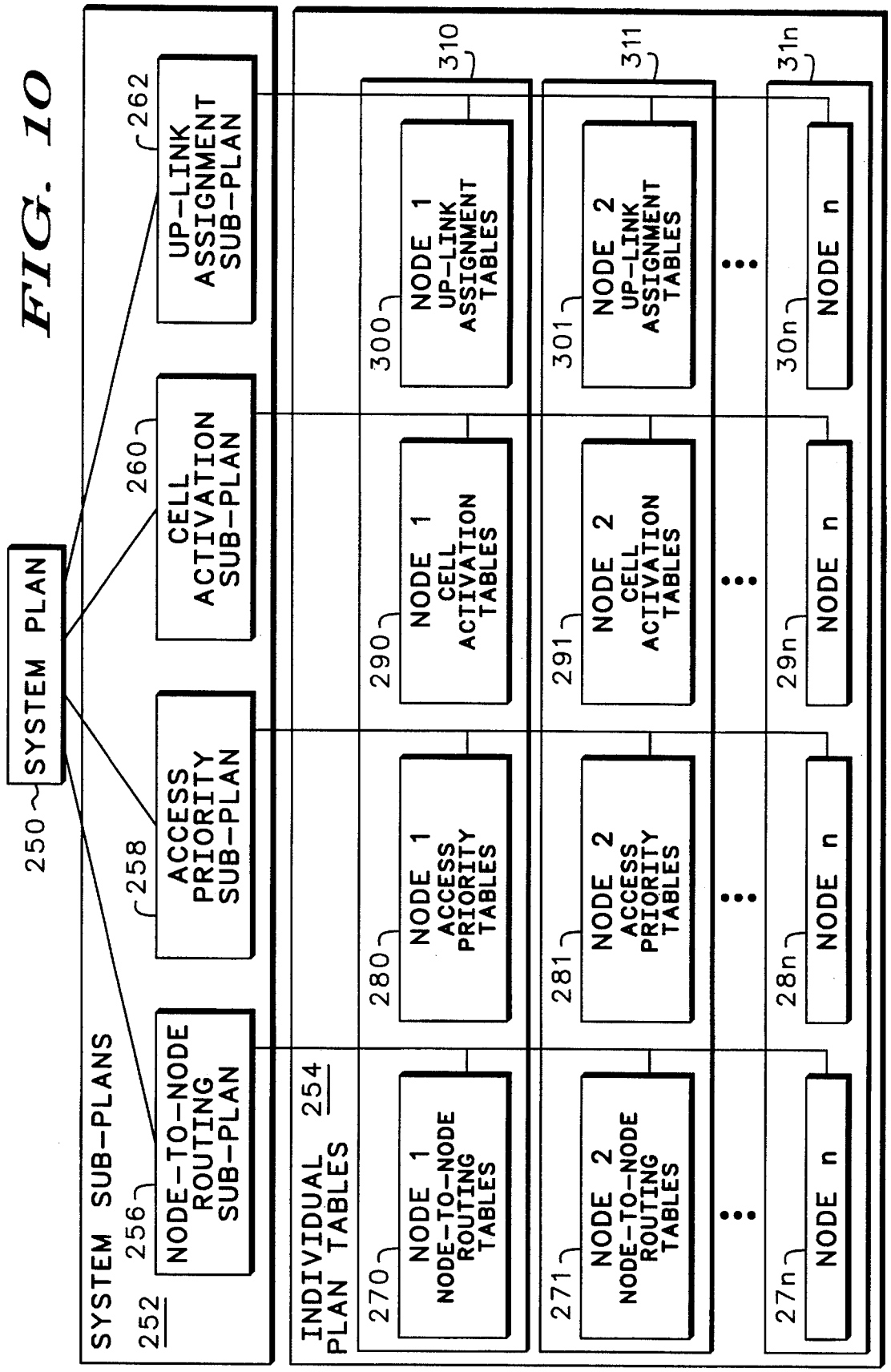
FIG. 10 shows a diagram of system plan components in accordance with the present invention.

FIG. 10 illustrates system plan 250 composed of system sub-plans 252 from which individual plan tables 254 are generated. System sub-plans 252 may include: node-to-node routing sub-plan 256, access priority sub-plan 258, access channel sub-plan (not shown), cell activation sub-plan 260, cell additional channel sub-plan (not shown), and up-link assignment sub-plan 262. FIG. 10 shows representative examples of possible system sub-plans 256–262. It does not show all possible system sub-plans, and the particular sub-plans 256–262 shown are not critical to the invention.

Individual plan tables 254 are derived from each system sub-plan 252. For example, from the node-to-node routing sub-plan 256, individual node-to-node routing tables 270-27n are derived. The use of the suffix "n" in the individual plan table numbers does not intend to convey that only 10 possible individual plan tables 254 are derived from one system sub-plan 252.

A set of individual plan tables includes all individual plan tables for a specific node. For example, for NODE 1, the set of individual plan tables 310 would include tables 270, 280, 290 and 300.

Figure 2:
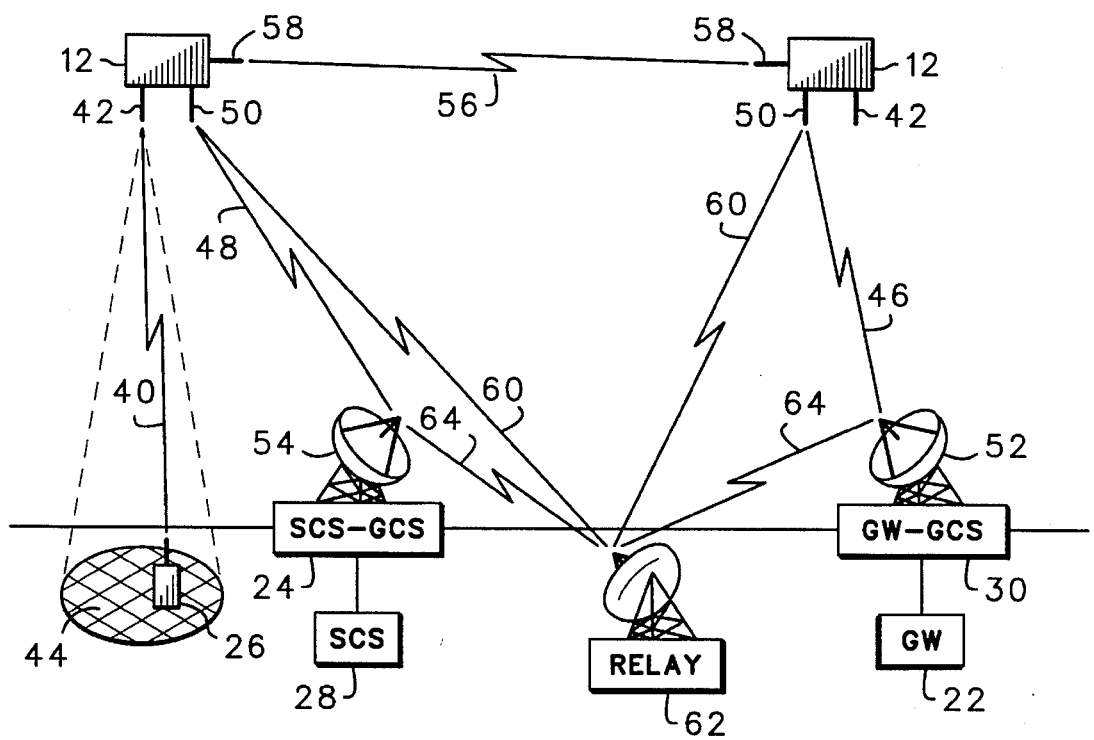
FIG. 2 shows a schematic diagram of communication links associated with a satellite-based cellular communication system.

After the individual plan tables are developed, the Distribute Individual Plan Table Sets process (block 222) distributes each system node's set of individual plan tables 310-31n to each system node. For example, the SCS 28 (FIG. 1) may distribute sets of individual plan tables 310-31n to each satellite 12 when a satellite becomes visible to the SCS-GCS 24 (FIG. 1) (i.e., "line of sight" table load). Alternatively, the sets of individual plan tables 310-31n may be distributed to the satellites 12 (FIG. 1) by transmitting the data over an up-link 46, 48 (FIG. 2) to a non-target satellite 12 (FIG. 1), and routing the data to the target satellite 12 (FIG. 1) over cross-links 56 (FIG. 2). Desirably, the sets of individual plan tables 310-31n are distributed to the system nodes prior to the time the corresponding system plan is to go into effect. However, some portion of the set of individual plan tables 310-31n may be distributed during the early execution of the corresponding system plan.

The Execute System Plan process (block 224, FIG. 9) begins at the time when the system nodes begin operating in accordance with their sets of individual plan tables 310-31n (FIG. 10) that correspond to a new system plan (i.e., execution begins at the start of the planning period for that system plan). The Execute System Plan process (block 224) is described in further detail in section C below.

During plan execution, the Monitor System Plan Execution process (block 226, FIG. 9) is performed. Monitor System Plan Execution (block 226) is conveniently performed in two segments: the system node segment, and the SCS segment.

Figure 11:
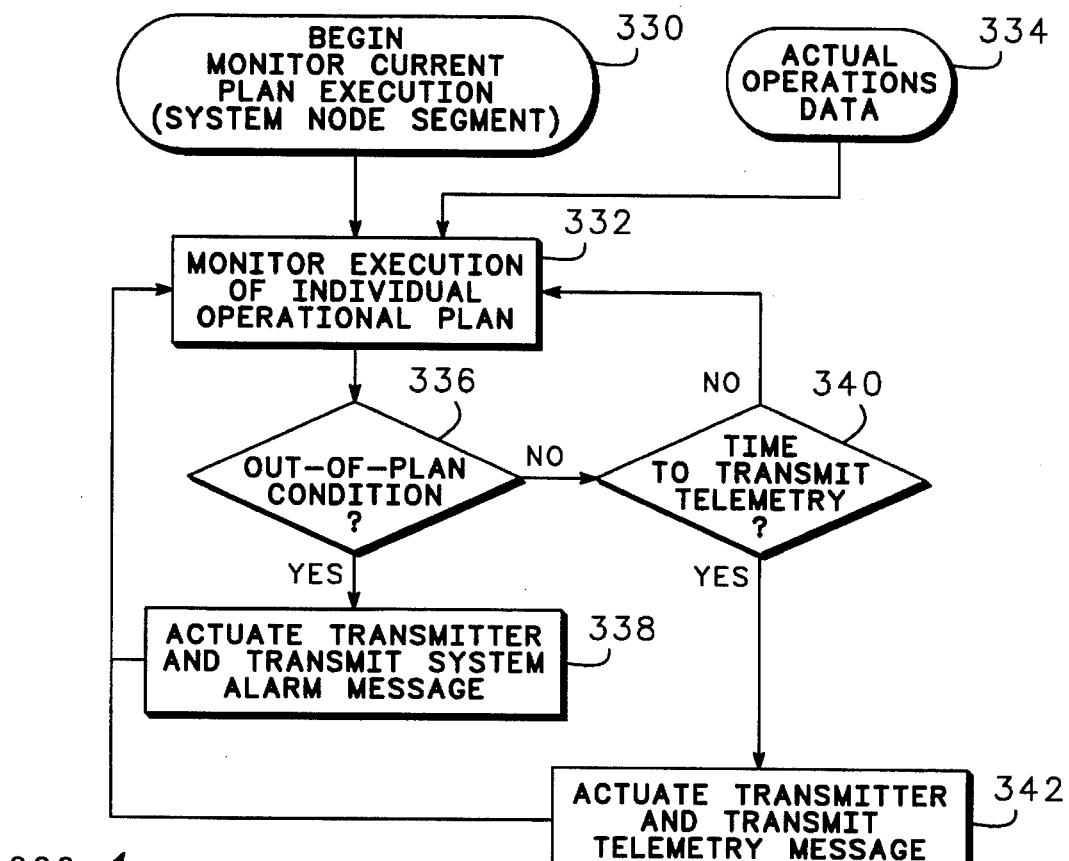
FIG. 11 illustrates a flow chart of a method for monitoring the current plan's execution within each system node in accordance with the present invention.

FIG. 11 depicts a flow diagram of the system node segment of Monitor System Plan Execution (block 226) which is performed by the system nodes. The system node segment begins (block 330) when the particular system node Monitors Execution of the individual operational plan (block 332) by evaluating actual operations data (block 334) (e.g., actual traffic levels, cross-link loads, etc.).

Using the actual operations data (block 334), the Monitor Execution process (block 332) determines whether an out-of-plan condition exists (block 336). An "out-of-plan" condition exists when the system node determines that unplanned events have occurred, or that actual operation exceeds (or soon will exceed) predetermined system plan thresholds resident within the individual plan tables. For example, a system plan threshold may dictate a maximum allowable number of calls that may be serviced at a particular time. When actual call demand exceeds the threshold of allowable number of calls (i.e., an unplanned event), an out-of-plan condition exists (block 336). When an out-of-plan condition occurs (block 336), the system node actuates a transmitter and transmits a system alarm message (block 338) which describes the out-of-plan condition to SCS 28 (FIG. 1). The process then iterates as shown in FIG. 11. In a preferred embodiment, a satellite 12 that detects that operations are running at or near a predetermined system plan threshold may modify its operation so as not to exceed the predetermined system plan threshold.

When no out-of-plan condition exists (block 336), the system node determines (block 340) whether it is time to transmit telemetry information to SCS 28 (FIG. 1). Transmission of telemetry information may occur periodically, for example. When it is not time to transmit telemetry information (block 340), the system node continues to Monitor Execution (block 332) and the procedure iterates as in FIG. 11. When it is time to transmit telemetry information (block 340), the system node actuates a transmitter and transmits the telemetry information (block 342) to SCS 28, and the process iterates as shown in FIG. 11. Desirably, each system node regularly transmits telemetry messages to the SCS 28 indicating the system node's "health" and "status". "Health" refers to the ability of a system node to perform a mission. For example, if one antenna or antenna cell is inoperable (i.e., unable to support traffic), the traffic carrying capacity of the satellite is diminished. "Status" refers to the availability of a resource at a particular time (e.g., a satellite is on or off line).

Figure 12:
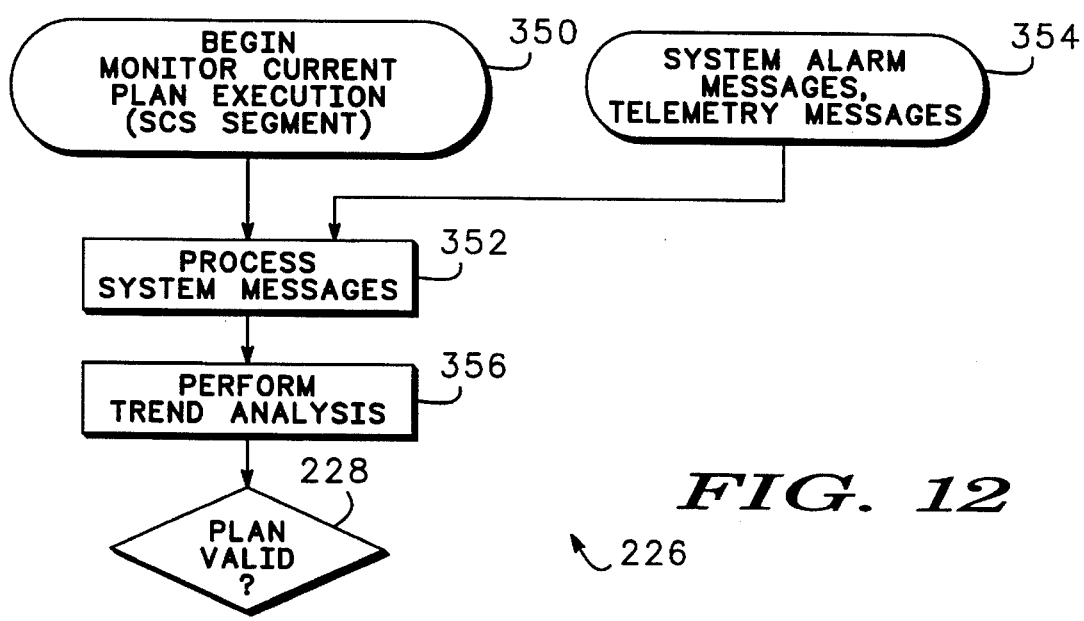
FIG. 12 illustrates a flow chart of a method for monitoring the current plan's execution within the system control segment in accordance with the present invention.

FIG. 12 depicts a flow diagram of the SCS segment of Monitor System Plan Execution (block 226). The SCS segment begins (block 350) with the Process System Messages function (block 352). The Process System Messages function (block 352) receives system alarm and telemetry messages (block 354) from the system nodes. The Process System Messages function (block 352) compiles these messages and invokes the Perform Trend Analysis function (block 356) which performs trend analyses to determine whether an out-of-tolerance condition is imminent if the current trend continues based on the system alarm and telemetry messages (block 354).

Referring again to FIG. 9, the NRM evaluates whether the currently running system plan is still "valid" (block 228, FIG. 9) from indications of imminent out-of-plan conditions from the Perform Trend analysis function (block 356, FIG. 12). The system plan is considered valid (block 228) when the system is meeting contractual requirements and current trends and loads will not cause the system to fall short of these requirements in the near future. In other words, the NRM determines whether the system plan is operating acceptably given unplanned system events and actual traffic demands.

If the currently executing system plan is still valid (block 228), the NRM determines (block 230) whether it is time for a new system plan to be generated for the next planning period. A new plan is desirably generated for the next planning period some time before the currently executing plan expires. The time to generate a new plan is based on the length of time it will take to generate the new plan, which will be dependent on the size and complexity of the communications system. It is not desirable to generate the new plan too far in advance, because the new plan desirably incorporates as much recent traffic history data and system node status data as possible. If it is not time for a new system plan to be generated (block 230), the NRM continues the Monitor System Plan Execution function (block 226). If it is time for a new system plan to be generated (block 230), the planning period is set (block 232) to the next planning period, and Develop Planning Directives process (block 212) is initiated. The procedure then iterates as shown in FIG. 9.

When the system plan is not valid (block 228), the NRM may decide (block 234) to replan the remainder of the currently executing system plan or to allow the currently executing system plan to run to completion. The NRM may decide (block 234) to allow the currently executing system plan to run to completion when system alarm messages (block 354) indicate that unplanned events have occurred, but the unplanned events will not have a major impact on the system's ability to handle traffic.

The NRM may decide (block 234) to replan the remainder of the currently executing system plan when system alarm messages (block 354) or indications of imminent out-of-plan conditions show that critical events are occurring within the system during execution of the system plan. One example where the NRM may decide to replan (block 234) is when the system plan, as it is currently running, will soon use up all outage minutes (i.e., allowable number of minutes of service interruption which are negotiated by contract) for a particular time period if the system plan continues to run with the unplanned events. A replan may be performed for all system nodes, or only for a set of specific system nodes. For example, the replan will desirably be generated for the system nodes whose individual system plans may be replanned such that the outage minutes may be avoided.

If the NRM decides to replan the remainder of the currently executing system plan (block 234), the planning period is set to the remainder of the current planning period (block 236). Then, the Develop Planning Directives process (block 212) is invoked and the procedure iterates as shown in FIG. 9.

In exigent circumstances (e.g., there is not enough time to generate an entire replan before major system damage occurs), the NRM may rapidly generate and distribute only a small portion of a replan (e.g., one hour's worth). Then, the NRM may generate and distribute the part of the replan covering the rest of the planning period while the smaller portion of the replan begins to execute.

If the NRM decides not to replan (block 234) the remainder of the currently executing system plan (i.e., the NRM decided to allow the currently executing system plan to run to completion), the NRM continues to Monitor System Plan Execution (block 226) as shown in FIG. 9.

The Execute System Plan function (block 224) and the Monitor System Plan Execution function (block 226) continue as background processes while the NRM performs other tasks (e.g., Generate System Plan (block 216) or Develop Individual Plan Tables (block 220)). For example, while the NRM is performing the Monitor System Plan Execution function (block 226), the NRM may also be generating a new system plan for the next planning period. In other words, for a planning period of one day, the NRM may be generating a new plan to run tomorrow while it is also monitoring execution of today's plan.

In the preferred embodiment, the length of the planning period and the start time of the planning period is conveniently the same for every new system plan generated, but this is not essential. For example, if the planning period is 24 hours, the start of execution of a new system plan may occur at, say, 5:00 P.M. Greenwich Mean Time (GMT) every day, or whatever other time is selected by the user.

In the preferred embodiment, a replan replaces the currently executing system plan only for the remainder of the current planning period. Therefore, if the currently executing system plan is declared invalid (block 228) at, say, 1:00 P.M. GMT, the NRM may replan the currently executing plan for the period of time between 1:00 P.M. GMT and 5:00 P.M. GMT (i.e., the remainder of the current planning period).

In an alternate embodiment, the start of execution of a new system plan may change over time. In other words, if the NRM decides to replan or to generate a new system plan, it may scrap the currently executing system plan, and begin executing a new system plan covering a full planning period at the time that the currently executing plan was terminated. Therefore, if the currently executing system plan, which began at 5:00 P.M. GMT, is declared invalid (block 228) at 1:00 P.M. GMT, the NRM may generate a new system plan covering a full planning period beginning at 1:00 P.M. GMT.

Assuming a 24 hour planning period, the next system plan generated will also begin executing at 1:00 P.M. GMT if the new system plan executes without the need to replan.

The method of the present invention applies to single coverage communications systems (i.e., where at least one satellite is visible from every point on the celestial body at all times, but in some areas, only one satellite is visible), plural coverage communications systems (i.e., where more than one satellite is visible from every point on the celestial body at all times) and also communications systems where full coverage of the celestial body is not achieved (i.e., where there are "holes" in the satellite coverage).

A. Generate System Plan

Figure 13:
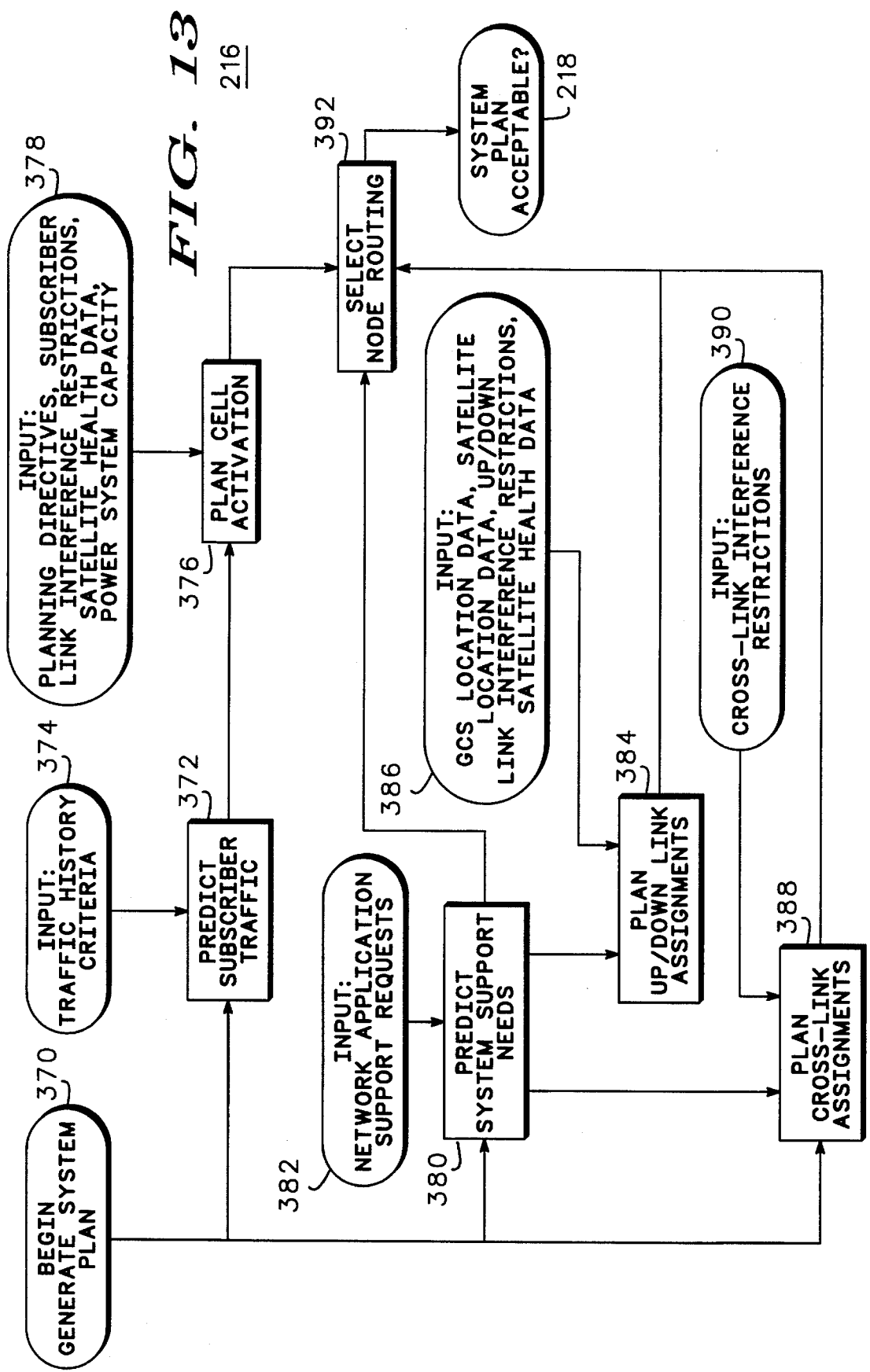
FIG. 13 illustrates a flow chart of a method for generating a system plan in accordance with the present invention.

FIG. 13 illustrates a process flow diagram for a Generate System Plan process (block 216, FIG. 9). The Generate System Plan process creates a system plan which schedules node resource usage during a specified planning period. A new system plan is desirably generated on a periodic basis (e.g., once per planning period).

Generation of a system plan entails:

a) predicting the quantity of subscriber traffic at each system node for the planning period;

b) planning how the subscriber traffic prediction could be accommodated by the system;

c) planning how up-links, down-links and cross-links should be assigned to accommodate system and user traffic; and d) creating an overall node routing plan based on the results of preceding steps a)–c).

Generate System Plan begins (block 370) by performing the Predict Subscriber Traffic function (block 372) which predicts various types of subscriber traffic (e.g., voice, fax, paging) and combines the predictions by geographic area and time of day.

The subscriber traffic predictions are based on input traffic history criteria (block 374) which represent a statistical data base of past traffic history. The traffic history criteria (block 374) are conveniently located in SCS resident memory 192 (FIG. 8) and the history is made more accurate over time as system operation continues by incorporating actual traffic loading. The currently executing system plan's traffic loading data are incorporated in a weighted sense into the statistical data base of traffic history. The modified statistical data base is used to predict what the traffic will be during future planning periods.

The Plan Cell Activation process (block 376) creates an access channel sub-plan, access priority sub-plan, cell activation sub-plan, and cell additional channel sub-plan. The access channel sub-plan indicates to the satellite 12 which access channels a SU 26 should use to initially access the system. The access priority sub-plan describes which acquisition priorities are being serviced by a particular cell of a satellite. The cell activation sub-plan tells the satellite when to turn specific cells "on" or "off" and what basic channel sets to use in each cell. Finally, the cell additional channel sub-plan describes which additional channel sets will be used in a given cell. These sub-plans are discussed in further detail in section B below.

Plan Cell Activation (block 376) uses the subscriber traffic prediction (from Predict Subscriber Traffic (block 372)) and inputs (block 378) of planning directives (from Develop Planning Directives (block 212)), subscriber link interference restrictions, satellite health data, and power system capacity. Subscriber link interference restrictions, satellite health data and power system capacity are conveniently located in SCS resident memory 192 (FIG. 8) which is accessible to the Plan Cell Activation (block 376) process.

Subscriber link interference restrictions are, for example, restrictions on usage of subscriber channels over certain geographic areas at certain times of the day. These restrictions may result from license prohibitions or external system interference. Subscriber link interference restrictions may apply to some or all of the active cells for a satellite. Interference sources cause disruption to the system, while interference recipients are disrupted by the system (e.g., a satellite with cells turned on while passing over a radio-astronomy station may cause scientific data to be lost). The satellite health data base is updated using system status and previously received alarm messages from the satellites.

Plan Cell Activation (block 376) creates metrics which describe how well the cell activation sub-plan converged with the predicted subscriber traffic requirements. These metrics are evaluated as part of the determination whether the system plan is acceptable (block 218, FIG. 9). Cell activation planning is discussed in further detail in section A1 below.

Predict System Support Needs (block 380) predicts the administrative overhead traffic (i.e., traffic required to operate and maintain the communications system) expected during the planning period, and determines the resources necessary to support that traffic (e.g., determines when and how long SCS-GCS antennas 54 need to be used). Predict System Support Needs (block 380) receives requests from other network applications (block 382) for the purpose of scheduling resource usage during line-of-sight passes between the SCS-GCS 24 (FIG. 1) and networked satellites 12 (FIG. 1). Such scheduling is required when sets of individual plan tables 310-31n (FIG. 10) need to be distributed or when other satellite software updates need to be made. Based on its administrative overhead traffic predictions, Predict System Support Needs (block 380) requests the usage of SCS-GCSs 24 (FIG. 1) and GW-GCSs 30 (FIG. 1) from the Plan Up/Down Link Assignments (block 384) function.

The Plan Up/Down Link Assignments function (block 384) uses the SCS-GCS 24 (FIG. 1) and GW-GCS 30 (FIG. 1) requests (block 380), inputs (block 386) of GW-GCS and SCS-GCS location data, satellite location data, up/down link interference restrictions and satellite health data to create an up/down link assignment sub-plan. Up/down link interference restrictions, satellite health data, GW-GCS and SCS-GCS location data, and satellite location data may be stored in SCS resident memory 192 (FIG. 8) which is accessible to the Plan Up/Down Link Assignments process. The satellite location data is determined for each planning period as described further in section A2 below. Up/down link interference restrictions apply to every field of view between each satellite and its GCS partner. Plan Up/Down Link Assignments (block 384) is discussed in further detail in section A2 below.

The Plan Cross-Link Assignments function (block 388) generates a cross-link assignment sub-plan. Plan Cross-Link Assignments (block 388) takes into account input (block 390) of cross-link interference restrictions. Cross-link interference restrictions may be stored in SCS resident memory 192 (FIG. 8) which is accessible to the Plan Cross-Link Assignments function (block 388). Cross-link interference restrictions apply to every field of view between each satellite and its cross-link satellite partner.

Predict Subscriber Traffic (block 372) and Predict System Support Needs (block 380) may be carried out in any order or in parallel without affecting the Generate New Plan results.

From the cell activation sub-plan, up-link assignment sub-plan and cross-link assignment sub-plan, the Select Node Routing function (block 392) produces a node-to-node routing sub-plan. The Select Node Routing function is discussed in further detail in section A3 below. After the Select Node Routing function (block 392), the Generate System Plan procedure exits to determine whether the system plan is acceptable or not (block 218).

A1. Plan Cell Activation

Figure 14:
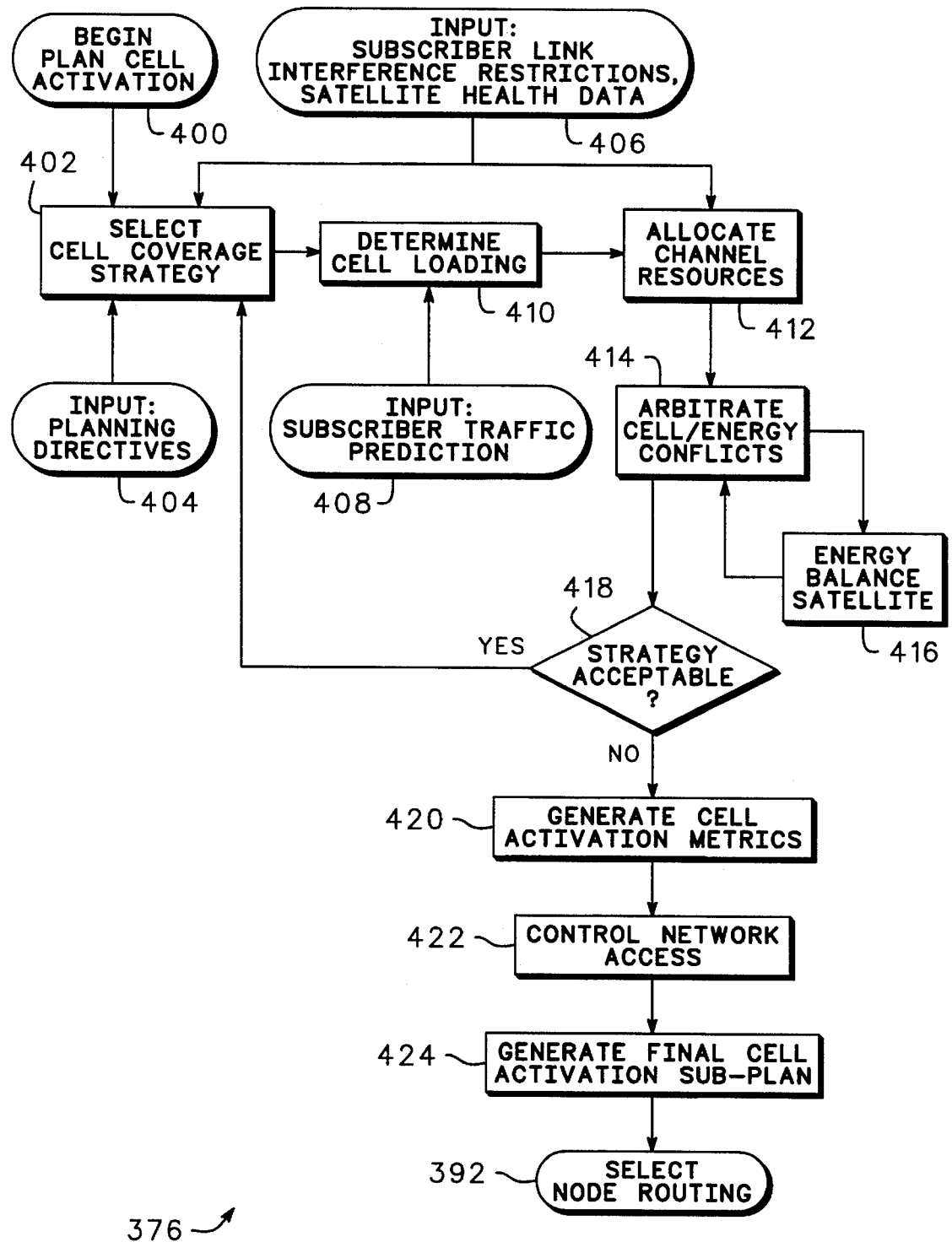
FIG. 14 illustrates a flow chart of a method for planning cell activation in accordance with the present invention.

FIG. 14 is a process flow diagram for the Plan Cell Activation function (block 376, FIG. 13). Plan Cell Activation (block 376, FIG. 13) results in an access channel sub-plan, access priority sub-plan, cell activation sub-plan, and cell additional channel sub-plan.

The Plan Cell Activation function begins (block 400) by selecting an initial subscriber cell coverage strategy (block 402), desirably stored in SCS resident memory 192 (FIG. 8), for cell activation and deactivation using input planning directives (block 404) from the Develop Planning Directives process (block 212, FIG. 9). For example, a subscriber cell coverage strategy defines cell nominal usage plans, and priorities in which cells are turned on and off as satellites converge and diverge, etc. This initial strategy may be modified based on inputs (block 406) of satellite health data and subscriber link interference restrictions. Satellite health data and subscriber link interference restrictions may be stored in SCS resident memory 192 (FIG. 8) which is accessible by the Select Cell Coverage Strategy function (block 402). For example, a modified strategy may unevenly distribute the subscriber load among the networked satellites due to a satellite outage or a predicted heavy traffic load.

With the subscriber traffic prediction as input (block 408) from the Predict Subscriber Traffic function (block 372, FIG. 13), the Determine Cell Loading process (block 410) predicts the cell, subsystem and total satellite load for each satellite resulting from the selected subscriber cell coverage strategy.

Using input of subscriber link interference restrictions (block 406), the Allocate Channel Resources process (block 412) applies an initial set of subscriber channels to the active cells.

Additional subscriber channel sets may be dynamically allocated to the cells to provide additional subscriber channels when cell loading is heavier than planned for. These additional subscriber channels permit more subscriber calls to be handled.

The Arbitrate Cell/Energy Conflicts function (block 414) initiates the Energy Balance Satellite process (block 416) for each satellite 12 (FIG. 1). The Energy Balance Satellite process (block 416) develops a predicted energy profile for each networked satellite 12 (FIG. 1) under the selected subscriber channel usage schedule. The consumption of the satellite's energy is predicted many orbits in advance. The actual energy capability of each satellite's power system is compared to the energy prediction to ensure that the planned energy consumption can be provided by the specific satellite when needed to meet the expected traffic.

When the actual energy capability will not meet the predicted consumption, the Arbitrate Cell/Energy Conflicts function (block 414) changes schemes for cell activation and frequency reuse to correct traffic overload situations or excessive energy demands on individual satellites. The Arbitrate Cell/Energy Conflicts, function (block 414) then re-initiates the Energy Balance Satellite process (block 416).

Once an energy balance is achieved, the Arbitrate Cell/Energy Conflicts function (block 414) creates metrics which indicate how well the predicted subscriber cell traffic was serviced given the available satellite energy.

Using these metrics, a determination is made (block 418) as to whether the selected cell coverage strategy acceptably handled predicted traffic using the selected cell coverage strategy. If the selected cell coverage strategy did not acceptably handle predicted traffic (block 418), the evaluation considers whether a different cell coverage strategy could be selected to improve system performance (i.e., to better handle predicted traffic), or whether the selected cell coverage strategy provides the best system performance given the resources available during the planning period. Even if all predicted traffic can not be handled, a cell coverage strategy may be considered acceptable when the NRM determines that the projected system performance is the best the system can do given available resources.

When it is determined (block 418) that a different cell coverage strategy can be selected (based on different planning directives (block 404)) which will improve system performance, the cell coverage strategy is considered not acceptable (block 418), and Select Cell Coverage Strategy (block 402) is re-invoked. The procedure iterates as shown in FIG. 14.

When it is determined (block 418) that the selected cell coverage strategy provides the best possible performance given available system resources, the Generate Cell Activation Metrics process (block 420) generates metrics which indicate what portions of predicted traffic were unable to be handled. These metrics are later used as part of the determination whether the system plan is acceptable (block 218, FIG. 9).

The Control Network Access function (block 422) is then performed to regulate which subscribers may access the satellite network when all traffic can not be handled within a cell. The Control Network Access function (block 422) ensures that an overload condition will be avoided during actual system operation. In the preferred embodiment, each SU 26 (FIG. 1) is given a random "access number" (e.g., between one and sixteen) when it is created in the factory. This random access number is conveniently stored in SU resident memory 118 (FIG. 4). If all traffic can be handled within a cell, all access numbers may be allowed access to the system. If all predicted traffic cannot be handled within a cell, Control Network Access (block 422) will regulate which access numbers the cell will provide service to at a particular time. For example, if a cell runs out of subscriber channels, the cell will broadcast a signal indicating that it will only serve access numbers 1, 2, and 3. This tells a SU 26 to not even attempt to make a call if its access number is not one being serviced at that time.

In an alternate embodiment, the access numbers may be granted to system users by order of priority. Then when a cell runs out of subscriber channels, it will only serve the highest priority subscribers.

The Generate Final Cell Activation Sub-Plan process (block 424) incorporates the cell coverage strategy and Control Network Access (block 422) results into a final cell activation sub-plan. The procedure exits to the Select Node Routing function (block 392).

A2. Plan Up/Down Link Assignments

Plan Up/Down Link Assignments (block 384, FIG. 13) generates a plan for the usage of up-links (i.e., feeder links 46, FIG. 2, and control links 48, FIG. 2), resulting in an up-link assignment sub-plan.

Figure 15:
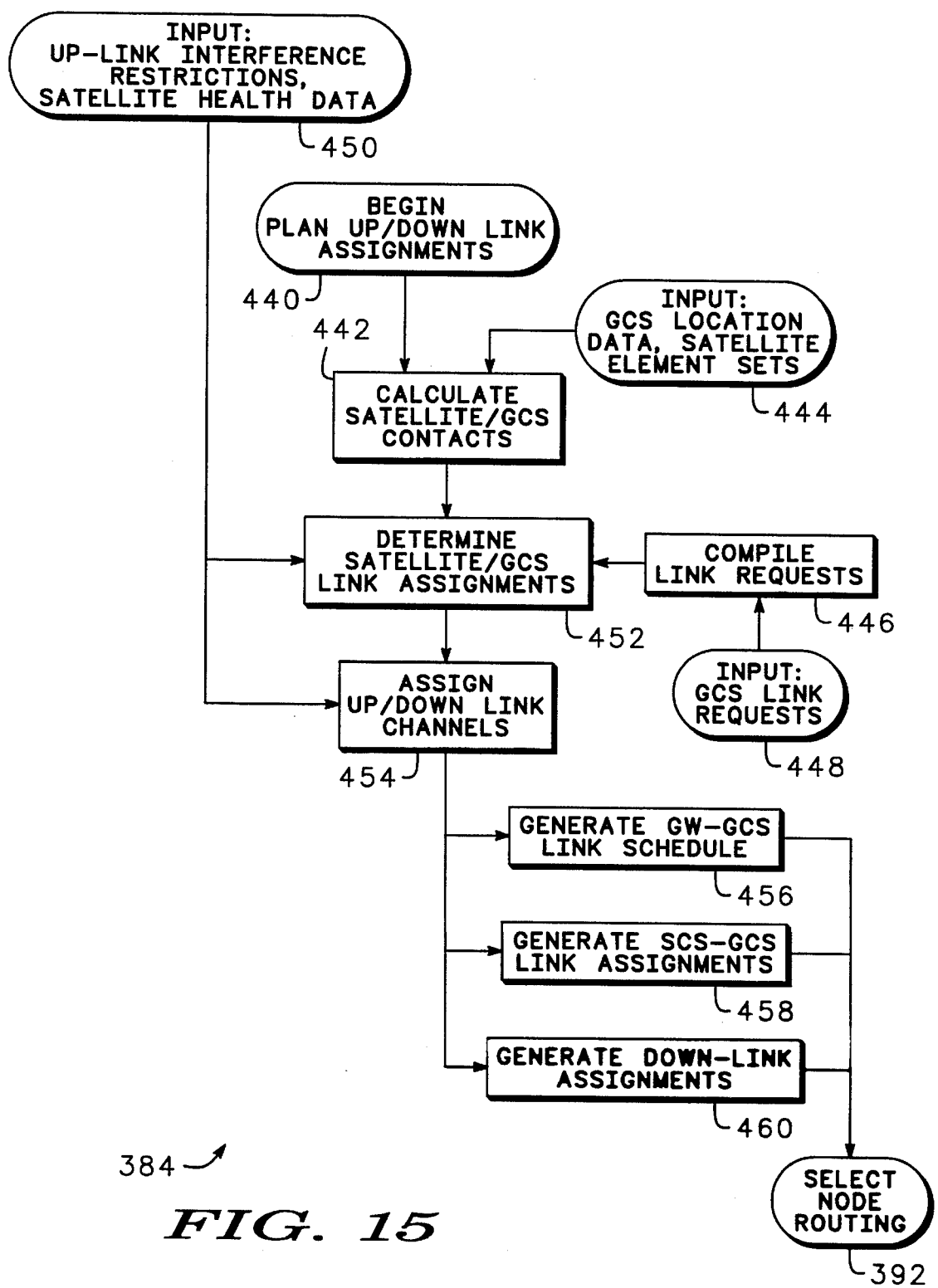
FIG. 15 illustrates a flow chart of a method for planning up-link assignments in accordance with the present invention.

FIG. 15 illustrates a process flow diagram for the Plan Up/Down Link Assignments function (block 384). Plan Up/Down Link Assignments begins (block 440) by performing the Calculate Satellite/GCS Contacts function (block 442) which determines all possible contact opportunities between GW-GCSs 30 (FIG. 1), SCS-GCSs 24 (FIG. 1) and all networked satellites 12 (FIG. 1). This entails predicting when each satellite will be visible to each GCS during the planning period using input GW-GCS and SCS-GCS location data and satellite element sets (block 444). GCS location data and satellite element sets are conveniently stored in SCS resident memory 192 (FIG. 8) which is available to the Plan Up/Down Link Assignments function.

The Compile Link Requests function (block 446) compiles GCS link requests (block 448) from the Predict System Support Needs function (block 380, FIG. 13). Contact opportunities from the Calculate Satellite/GCS Contacts function (block 442), compiled GCS link requests from the Compile Link Requests function (block 446), up-link interference restrictions and satellite health data 450 are input to the Determine Satellite/GCS Assignments function (block 452), which allocates specific satellite antennas to support satellite 12 (FIG. 1) passes (i.e., contacts) over GW-GCS 30 (FIG. 1) or SCS-GCS 24 (FIG. 1). Satellite health data and up-link interference restrictions are conveniently stored in SCS resident memory 192 (FIG. 8), which is accessible to the Determine Satellite/GCS Assignments function (block 452). Satellite health is taken into account when scheduling its resources to support a pass (i.e., a contact) over a GCS. Antenna slew rates, physical or RF interference between a satellite's multiple down-link antennas 50, and link setup time for slew and acquisition are also considered when link assignments are made.

Based on input up-link interference restrictions and satellite health data (block 450), the Assign Up/Down Link Channels function (block 454) assigns up/down-link channels to each satellite/GCS link assignment received from the Determine Satellite/GCS Assignments function (block 452). The result of block 454 is a channel assignment table containing GW-GCS 30 (FIG. 1) and SCS-GCS 24 (FIG. 1) assignments.

The Generate GW-GCS Link Schedule function (block 456) extracts individual gateway link assignments from the channel assignment table and constructs a gateway link support schedule. The Generate SCS-GCS Link Assignments function (block 458) separates link assignments from the channel assignment table for the SCS-GCSs 24 (FIG. 1). The Generate Down-Link Assignments function (block 460) separates link assignments from the channel assignment table for the satellites 12 (FIG. 1).

The procedure then exits to the Select Node Routing function (block 392).

A3. Select Node Routing

Figure 16:
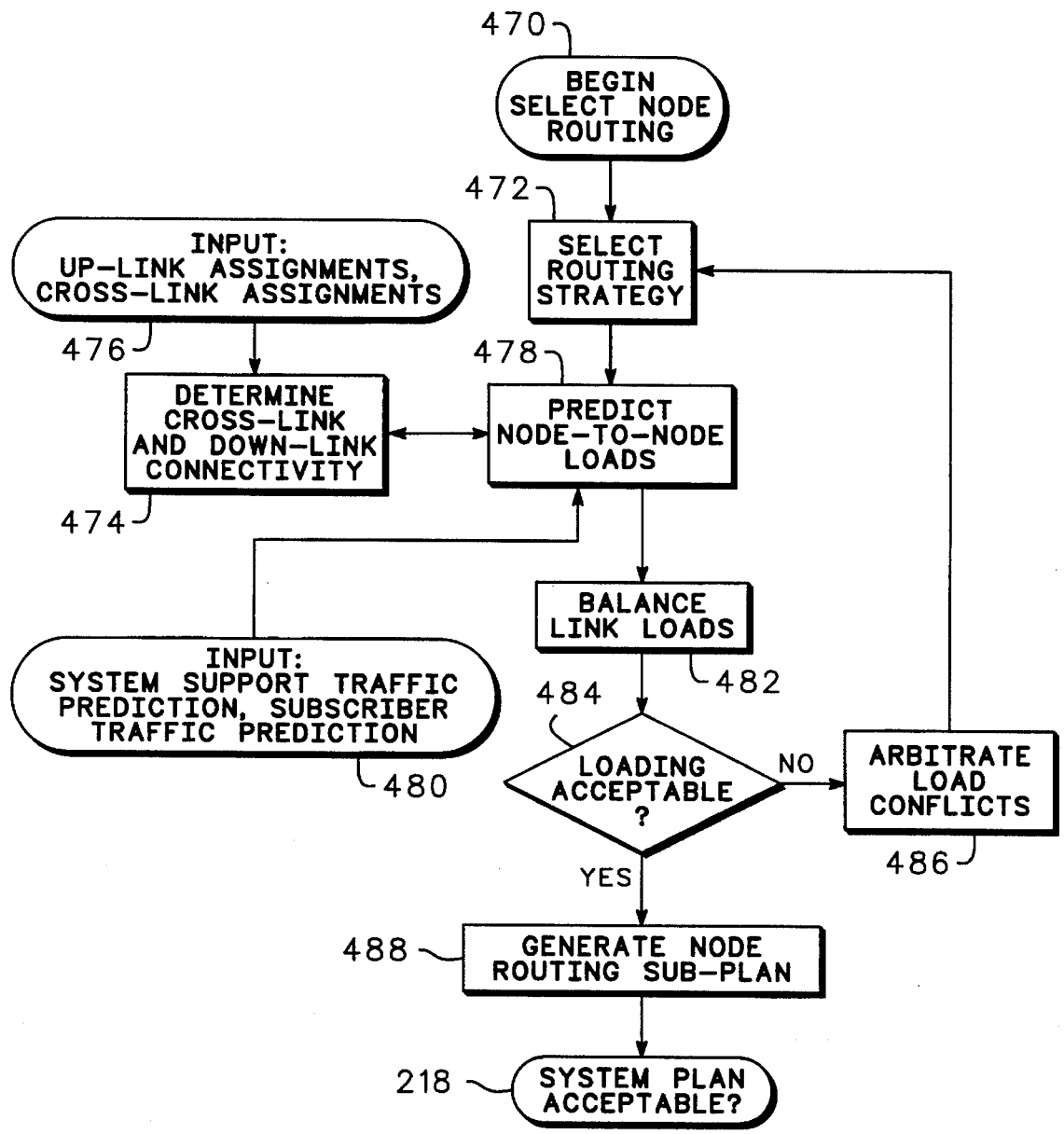
FIG. 16 illustrates a flow chart of a method for selecting node routing in accordance with the present invention.

FIG. 16 illustrates a process flow diagram of the Select Node Routing function (block 392, FIG. 13). The Select Node Routing function (block 392) receives all previous predictions of traffic and network usage and determines the best way to configure the system for routing. The Select Node Routing function (block 392) results in a node-to-node routing sub-plan that contains the information which the system nodes require to route data between two or more locations.

Select Node Routing begins (block 470) by performing the Select Routing Strategy function (block 472). Routing strategies are conveniently stored in SCS resident memory 192 (FIG. 8). For example, a routing strategy may be selected such that voice traffic receives the shortest path through the system. The Determine Cross-Link and Down-link Connectivity function (block 474) generates down-link connectivity data using input (block 476) up-link assignments from the Plan Up/Down Link Assignments function (block 384, FIG. 13), and cross-link assignments from the Plan Cross-Link Assignments function (block 388, FIG. 13).

The Predict Node-to-Node Loads process (block 478) predicts loads on up/down-links and cross-links from the connectivity data from the Determine Cross-link and Down-Link Connectivity function (block 474), the predicted subscriber traffic (block 480) from the Predict Subscriber Traffic process (block 372, FIG. 13), and the predicted system support traffic (block 480) from the Predict System Support Needs process (block 380, FIG. 13).

The Balance Link Loads process (block 482) balances node-to-node loads within the limits of the selected routing strategy. Once an load balance is achieved, the Balance Link Loads process (block 482) creates metrics which indicate how well the predicted node-to-node traffic was handled given the available traffic capacity.

Using these metrics, a determination is then made (block 484) as to whether the selected routing strategy acceptably handled predicted traffic loading. When loading is not acceptable (block 484), the Arbitrate Load Conflicts function (block 486) examines reported load/routing conflicts and determines alternative routing strategies to eliminate the conflicts. The revised strategy is sent to the Select Routing Strategy function (block 472) and the procedure iterates as shown in FIG. 16. When the loading is acceptable (block 484), the Generate Node Routing Sub-Plan process (block 488) creates a node routing sub-plan for each system node that has routing capability. The procedure exits to the System Plan Acceptable determination (block 218, FIG. 9).

B. Develop Individual Plan Tables

After the NRM determines that the system plan is acceptable (block 218, FIG. 9), The Develop Individual Plan Tables process (block 220, FIG. 9) develops individual plan tables 270-30n (FIG. 10) that represent each system node's unique portion of the system sub-plans 256–262 (FIG. 10). Each individual plan table 270-30n (FIG. 10) controls each node's usage of a particular system resource. A unique set of individual plan tables 310-31n (FIG. 10) is sent to each system node. In an alternate embodiment, one large plan table representing the entire system plan or a portion thereof may be sent to the system nodes, rather than sending a set of individual plan tables 310-31n (FIG. 10).

Table I is an illustrative list of the different individual plan tables developed for different satellite resources for the exemplary system. Those of skill in the art will understand based on the description herein how to modify the required list of individual plan tables for physically different telecommunications systems.

TABLE I

| Individual Plan Tables |
|---|
| • node-to-node routing tables |
| • location area code tables |
| • access priority tables |

TABLE I-continued

Individual Plan Tables

- access channel tables
- cell activation tables
- cell additional channel tables
- down-link assignment tables
- cross-link assignment tables
- up-link assignment tables After an individual plan table is received by a system node, the individual plan table is evolved into two separate tables: an execution table and a timed update command table. A timed update command table is desirably associated with each execution table, thus the tables are desirably found in pairs. Both types of tables conveniently reside in the memory of the system node.

An execution table contains directives which the system node accesses to make resource usage decisions during system plan operation. In the preferred embodiment, the major sub-systems within the system node use the execution table to control operations. If the execution table is never altered, the system node may potentially run forever as dictated by the execution table, wrong or not. This has the advantage of providing for continuing operation of the system, at least at some level, even if communications of new plan updates are temporarily interrupted.

A timed update command table is used by the system node to periodically or aperiodically change entries in the corresponding execution table. The evolution of the individual plan table into execution and timed update tables and the interaction of the execution and timed update command tables are described in further detail in section C below.

During creation of the individual plan tables for a new system plan, the NRM desirably verifies that the new individual plan tables are contiguous in time with the individual plan tables currently executing in each system node, such that consecutive individual plans are seamless. New individual plan tables generated for a replan will generally overlap with individual plan tables currently executing in each system node because a replan is generally intended to replace all or part of the remaining portion of the currently executing system plan.

The use of individual plan tables is a particular feature of the present invention because changes to the resource usage plan are not based on fixed time increments where all system nodes are updated periodically at the lowest time increment. Individual plan tables may cause a node to change its operation at any time because each node uses its own unique set of individual plan tables.

The use of individual plan tables saves significant system resources. In typical prior art resource management systems, the system control segment would send an entire, new table to update a previous execution table. The update typically occurs at every time increment. On the other hand, the NRM of the present invention is able to update a single entry in the execution table without overwriting the entire table.

The following sets of tables give examples of execution tables and their associated timed update command tables.

Tables II.a. and II.b. show exemplary Node-to-Node Routing tables. These tables tell the satellite in which direction on the cross-links 56 (FIG. 2) or up/down links 46, 48, 60 (FIG. 2) to route data having a specified destination node ID address. A destination node ID address may refer to another satellite 12 (FIG. 1), or to a ground station (e.g., SCS 28, FIG. 1). Each system node is desirably assigned a unique destination node ID. In Tables II.a. and II.b., the destination node ID numbers and the link designations are merely exemplary, and any method of designating a particular destination node or link may be used.

TABLE II.a.

Node-to-Node Routing Execution Table

| Destination Node ID | Primary Link | Alternate Link |
| --- | --- | --- |
| 1 | "Fore" | "Left" |
| 2 | "Downlink A" | "Right" |
| 3 | "Left" | "Aft" |
| ... | | |

TABLE II.b.

Node-to-Node Routing Timed Update Command Table

| Day of Year | Time of Day | Destination Node ID | Primary Link | Alternate Link |
| --- | --- | --- | --- | --- |
| 365 | 23:00:03 | 2 | "Right" | "Fore" |
| 365 | 23:47:18 | 57 | "Aft" | "Left" |
| 1 | 00:12:15 | 8 | "Left" | "Downlink A" |
| 1 | 01:33:47 | 42 | "Left" | "Aft" |
| ... | | | | |

Tables III.a. and III.b. show exemplary Location Area Code tables. These tables indicate the geographic coordinates of the center locations of each subscriber cell of a particular satellite using a predetermined coding system. Each subscriber cell is desirably assigned a cell ID number which is unique within a given satellite. In Tables III.a. and III.b., the cell ID numbers are merely exemplary, and any method of designating a particular cell may be used. Additionally, 48 cells are shown for purposes of example, however, more or fewer cells may be used. The particular location area codes shown in Tables III.a. and III.b. are chosen merely for purposes of illustration and any kind of location area code may be used, including latitude and longitude. This information is broadcast to all SUs 26 (FIG. 1) within that cell ID's coverage area.

TABLE III.a.

Location Area Code Execution Table

| Cell ID | Cell Center Location Area Code |
| --- | --- |
| 1 | 40341 |
| 2 | 40267 |
| 3 | 34201 |
| ... | |
| 48 | 60789 |

TABLE III.b.

Location Area Code Timed Update Command Table

| Day of Year | Time of Day | Cell ID | Cell Center Location Area Code |
| --- | --- | --- | --- |
| 365 | 23:00:03 | 2 | 40224 |
| 365 | 23:47:18 | 33 | 10172 |
| 1 | 00:12:15 | 8 | 55035 |
| ... | | | |

Tables IV.a. and IV.b. show exemplary Access Priority tables. These tables indicate which access priority numbers are currently being serviced by a particular cell. This information is broadcast by a satellite 12 (FIG. 1) to all SUs 26 (FIG. 1) within that cell coverage area. In Tables IV.a. and IV.b., access priorities are indicated by a number between 1 and 15, but this is merely for purposes of illustration and any means of indicating priorities may be used. Cell ID designations are also exemplary.

TABLE IV.a.

| Access Priority Execution Table | |
| --- | --- |
| Cell ID | Priorities |
| 1 | 5 |
| 2 | 6,8,10,12 |
| 3 | 7,9,11,13 |
| ... | |
| 48 | 3,6,14 |

TABLE IV.b.

| Access Priority Timed Update Command Table | | | |
| --- | --- | --- | --- |
| Day of Year | Time of Day | Cell ID | Priorities |
| 365 | 23:00:03 | 2 | 2,3,4 |
| 365 | 23:47:18 | 33 | 6 |
| 1 | 00:12:15 | 8 | 1,15 |
| ... | | | |

Tables V.a. and V.b. show exemplary Access Channel tables. For, example, there may exist 120 different channels potentially available to a SU 26 (FIG. 1). These tables indicate which subscriber channels the SUs 26 (FIG. 1) within a particular cell should use to initially access the system. The access channel information is broadcast to all SUs 26 (FIG. 1) within that cell coverage area. As with the other Tables, the access channel entries and the cell ID numbers in Tables V.a. and V.b. are merely exemplary.

TABLE V.a.

| Access Channel Execution Table | |
| --- | --- |
| Cell ID | Access Channels |
| 1 | 1,5,7,9 |
| 2 | 10,30,70 |
| 3 | 20,22,24 |
| ... | |
| 48 | 2,32,52,62,112 |

TABLE V.b.

| Access Channel Timed Update Command Table | | | |
| --- | --- | --- | --- |
| Day of Year | Time of Day | Cell ID | Access Channels |
| 365 | 23:00:03 | 2 | 12,15 |
| 365 | 23:47:18 | 33 | 6,9,10,13 |
| 1 | 00:12:15 | 8 | 4 |
| ... | | | |

Tables VI.a. and VI.b. show exemplary Cell Activation tables. These tables tell a satellite 12 (FIG. 1) when to turn specific cells "on" or "off," and what basic subscriber channel set ("Basic Set") to use in each cell. For example, a basic subscriber channel set may be a set of eight channels. Two basic subscriber channel sets are shown below to activate each cell. The cell IDs, and basic channel set designations shown in Tables VI.a. and VI.b. are for exemplary purposes only, and other cell ID number and basic subscriber channel set designations may be used.

TABLE VI.a.

| Cell Activation Execution Table | | |
| --- | --- | --- |
| Cell ID | Basic Set 1 | Basic Set 2 |
| 1 | off | off |
| 2 | 4 | 2 |
| 3 | 28 | 30 |
| ... | | |
| 48 | 12 | 10 |

TABLE VI.b.

| Day of Year | Time of Day | Cell ID | Set # | Set ID |
| --- | --- | --- | --- | --- |
| 365 | 23:00:03 | 2 | 1 | 22 |
| 365 | 23:47:18 | 33 | 2 | 6 |
| 1 | 00:12:15 | 8 | 2 | 39 |
| ... | | | | |

Tables VII.a. and VII.b. show exemplary Cell Additional Channel tables. These tables indicate additional channel set which may be used in a satellite 12 (FIG. 1) if necessary to support actual traffic. Cells carrying "hot spots" (i.e., areas of unexpectedly heavy traffic) will be given additional channels, as designated, to be used in those cells. For purposes of example, 120 additional channel sets are shown in Tables VII.a. and VII.b. and each additional channel set is used in up to seven non-adjacent cells within a satellite, although different numbers of additional channel sets may be assigned to different numbers of cells. The additional channel set and cell ID designations are purely exemplary.

TABLE VII.a.

| Cell Additional Channel Execution Table | | | |
| --- | --- | --- | --- |
| Additional Channel Set | 1st Cell ID | ... | 7th Cell ID |
| 1 | 12 | ... | — |
| 2 | 23 | ... | 46 |
| ... | | | |
| 120 | 12 | ... | — |

TABLE VII.b.

| Cell Additional Channel Timed Update Command Table | | | | |
| --- | --- | --- | --- | --- |
| Day of Year | Time of Day | Channel Set | Cell ID | Change |
| 365 | 23:00:03 | 15 | 10 | add |
| 365 | 23:47:18 | 2 | 22 | remove |
| 1 | 00:12:15 | 8 | 2 | remove |
| ... | | | | |

Satellites 12 (FIG. 1) also contain Down-link Assignment tables and Cross-link Assignment tables. The Down-link Assignment tables and the Cross-link Assignment tables contain information which the satellite down-link antennas 50 (FIG. 2) and cross-link antennas 58 (FIG. 2) use to establish a link between a ground terminal or a neighbor satellite 12 (FIG. 1), respectively. This information desirably includes:

what antenna to use (when there are multiple down-link 50 or cross-link 58 antennas);

when to start the antenna slewing process;

when to turn "on" the acquisition signal;

when to expect data to start arriving;

when to shut the link down;

which transmit and receive channels to use;

which ground terminal or neighbor satellite 12 (FIG. 1) to use as an aim point; and the initial power level to use for acquisition.

GW 22 (FIG. 1) or GW-GCS 30 (FIG. 1) contains Up-Link Assignment Tables which contain information which the GW-GCS 30 (FIG. 1) uses to establish a link with a satellite 12 (FIG. 1). This information desirably includes:

what antenna to use (when there are multiple GW-GCS up-link antennas 52);

when to start the antenna slewing process;

when to turn "on" the acquisition signal;

when to expect data to start arriving;

when to shut the link down;

which transmit and receive channels to use;

which satellite 12 (FIG. 1) to use as an aim point; and the initial power level to use for acquisition.

Tables II–VII and the Down-Link Assignment, Up-Link Assignment and Cross-link Assignment tables contain information that will carry out a pre-determined system plan in a determinable way. Except for additional channel set allocations and replan situations, execution of the system plan is desirably not affected by actual traffic.

In an alternate embodiment, additional tables may be created which provide decisional information that the satellite may use to respond to variations in the operating conditions and/or the traffic received by the satellite. These tables would allow the satellites to adaptively operate dependent on traffic. For example, a table may provide decisional information such as: if the available stored energy in a satellite battery is down to level X, and the satellite is approaching a certain geographic region, then the satellite would modify its access priorities prior to reaching the geographic area. This ability to modify the behavior of the satellite in real-time allows for a more flexible system providing more efficient operation.

C. Execute Plan

After a set of individual plan tables have been received by a system node, the system node may subsequently execute the corresponding system plan. The individual plan tables are evolved by the system node into two types of tables required for execution of a system plan (block 224, FIG. 9). As described in Section B, these tables are an execution table and a timed update command table.

An execution table is a set of directives which the system node accesses to make resource usage decisions during system operation. A timed update command table is desirably a first-in first-out (FIFO) queue which contains entries from all received individual plan tables which have not already been executed or overwritten by replan entries. Each entry within the timed update command table has a time associated with it. These times were determined during the generate system plan process to be the time at which the entry should be used to overwrite an entry in the corresponding execution table. The timed update command table is desirably arranged in chronological order.

Desirably, a timed update command table exists for each execution table, as is conveyed by Tables II–VII. However, in an alternate embodiment, one large timed execution table could exist with all entries for all execution tables contained therein. This embodiment would require that each entry within the timed update command table would contain information indicating which execution table it was meant to modify.

Figure 17:
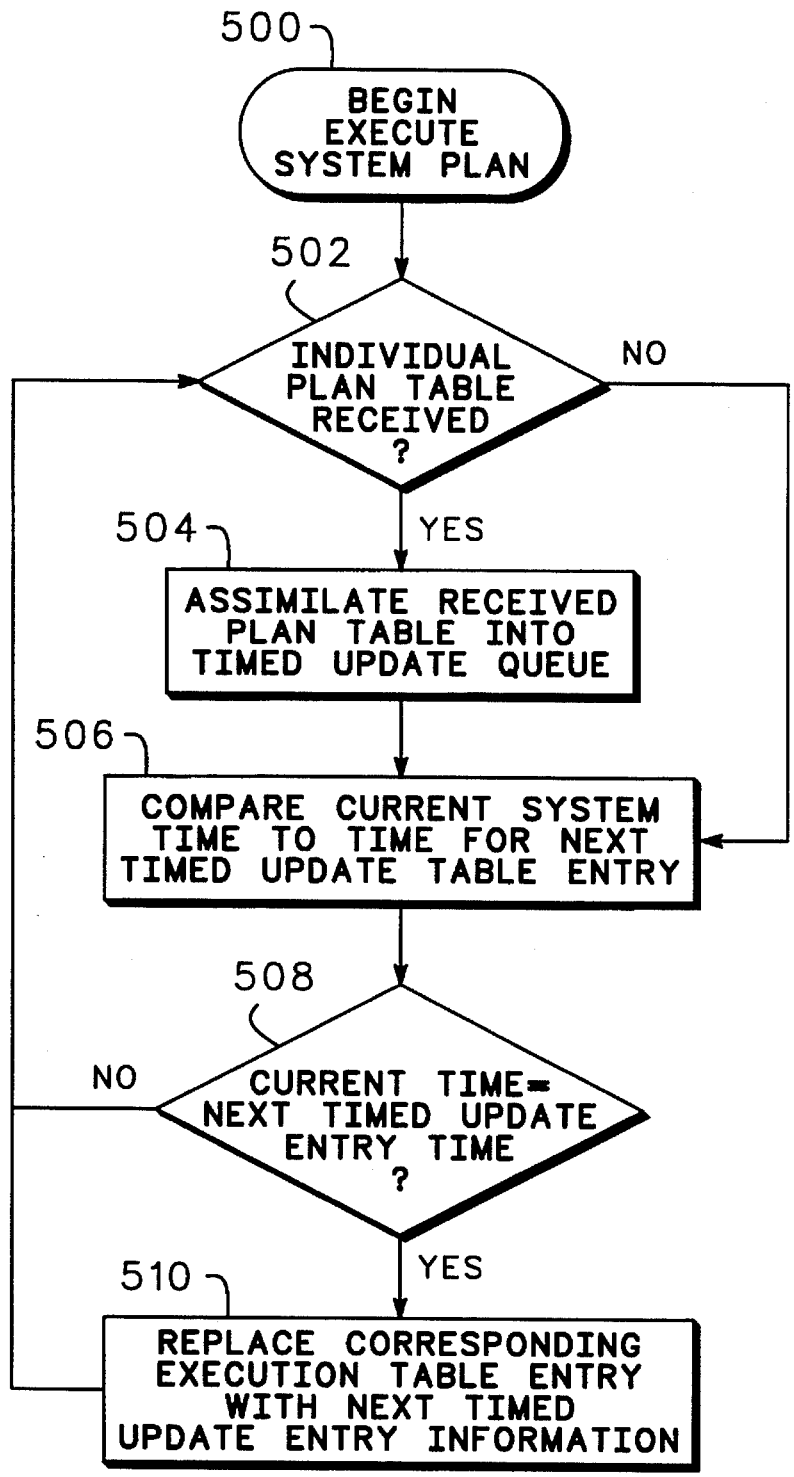
FIG. 17 illustrates a flow chart of a method for beginning system plan execution in accordance with the present invention.

FIG. 17 is a flow diagram of the Execute System Plan process (block 224, FIG. 9), which is carried out within each system node. The Execute System Plan process begins (block 500) when the system node determines whether an individual plan table (or a set of individual plan tables) has been received (block 502) from the SCS 28 (FIG. 1). When no individual plan table has been received (block 502), execution of the currently executing system plan continues by comparing current system time to the time for the next timed update table entry (block 506). This comparing step is described further below.

When an individual plan table has been received (block 502), the system node assimilates the individual plan table (block 504) into the corresponding timed update command table.

If the received individual plan table is a portion of a new system plan, the individual plan table will be assimilated (block 504) by appending the plan table to the end of the timed update command table. If the received individual plan table is a replan, the individual plan table will be assimilated (block 504) by inserting individual plan table entries into the appropriate chronologically determined locations in the timed update command table. This may entail overwriting some entries in the timed update command table.

After the individual plan table has been assimilated (block 504), the system node reads the time of the next entry in the timed update command table and compares (block 506) this time with the system time (i.e., a reference time known to the system nodes). When the two times are not equal (or within some minimum tolerance) (block 508), the system node again determines whether an individual plan table has been received (block 502) and the procedure iterates as shown in FIG. 17.

When the two times are equal (or within some minimum tolerance) (block 508), the system node replaces the corresponding execution table entry with the next timed update entry (block 510). The procedure then iterates as shown in FIG. 17.

Those of skill in the art will understand based on the description herein that monitoring for receipt of an individual plan table (block 502), assimilating the individual plan table (block 504), comparing system time (block 506) and replacing execution table entries (block 510) may be carried out in series as shown in FIG. 17, or alternatively may be carried out in parallel. For example, detecting receipt of an individual plan table (block 502) could be an interrupt driven task, wholly independent from comparing system time (block 506) and replacing execution table entries (block 510). Additionally, assimilating a received plan table (block 504), for example, may not necessarily be performed in one step, but may occur as a background task in, say, a system node which is capable of parallel processing or time-sharing between tasks (e.g., a software real-time executive).

Figure 18:
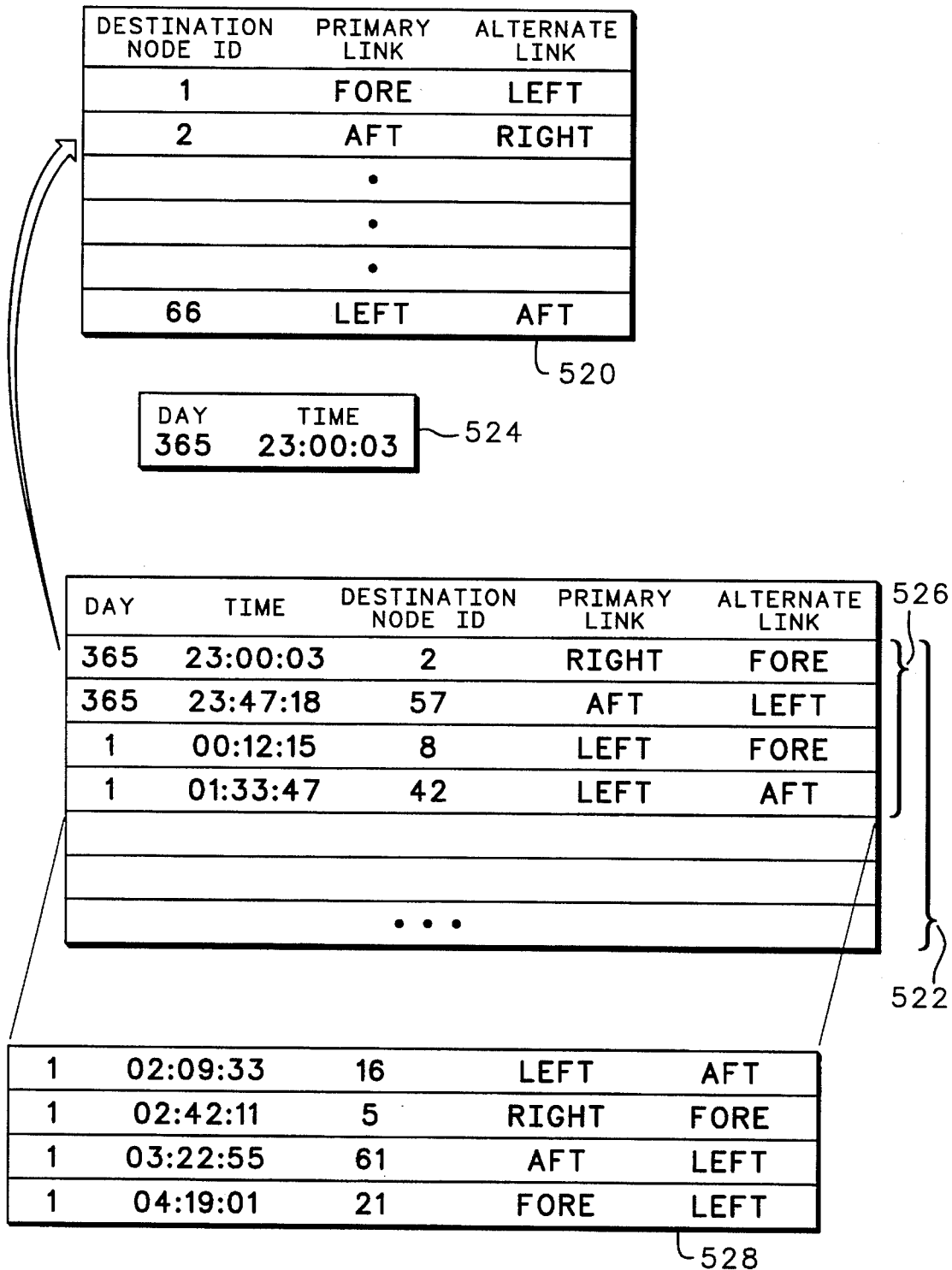
FIG. 18 shows a diagram of execution table and timed update command table interaction in accordance with the present invention.

FIG. 18 illustrates an example of how execution of a new system plan occurs via interaction of execution tables and timed update command tables. For this example, a node-to-node routing execution table 520 and node-to-node routing timed update command table 522 are shown (see Tables II.a. and II.b.) as they are used in a satellite 12 (FIG. 1).

At a first time, a satellite 12 (FIG. 1) is operating in accordance with node-to-node routing execution table 520. When data with a specified destination node ID is received by that satellite 12 (FIG. 1), the satellite 12 (FIG. 1) will route the data to the destination node via the primary link specified in the execution node-to-node routing table 520 for that destination node. For example, if data is received by the satellite 12 (FIG. 1) with node ID 2 as the destination, the satellite 12 (FIG. 1) will route the data to the "aft" satellite if the primary link is functional. If the primary link is not functional, the data will be routed "right" in accordance with the alternate link designation.

When the system time 524 reaches 23:00:03 of day 365, the entry in the node-to-node routing execution table 520 corresponding to node ID 2 will be overwritten with information within the next entry of the timed update command table 522. Thus, the primary link will be changed from "aft" to "right" and the alternate link will be changed from "right" to "fore". The node-to-node timed update command table 522 desirably exists within a chronologically arranged FIFO queue. In FIG. 18, the portion 526 of the timed update command table 522 represents the last four entries of the satellite's portion of the currently executing system plan.

When a new node-to-node routing individual plan table 528 representing the satellite's portion of a new system plan is received by the satellite 12 (FIG. 1), the new timed update command table 528 is appended to portion 526 of the currently executing timed update command table in FIFO queue 522. When the satellite 12 (FIG. 1) receives a node-to-node routing individual plan table representing the satellite's portion of a replan of the currently executing plan, the satellite 12 (FIG. 1) replaces entries affected by the replan within the currently executing timed update table 522. For example, the replan may only require modification of a timed update entry corresponding to time 1:33:47 of day 1. Only that entry of timed update command table 522 will be modified.

As described above, a satellite 12 (FIG. 1) is capable of routing data based on a node-to-node routing execution table. Additionally, a satellite 12 (FIG. 1) is capable of "screening data" that is not authorized to access the communications system. System data and subscriber data desirably contain "header information" which a satellite 12 (FIG. 1) may read to determine whether that data is authorized to be routed through the communications system. When data received by a satellite 12 (FIG. 1) contains no header information, or invalid header information, the satellite 12 (FIG. 1) may choose to not route the data through the system. When the data received by a satellite 12 (FIG. 1) contains valid header information, the satellite 12 (FIG. 1) may route the data through the communications system in accordance with the node-to-node routing execution table.

It is desirable to screen data for several reasons. One reason is to stop unauthorized individuals from pirating system resources as a means to communicate their own data. To stop this abuse, each system node may include an access code within the header information of data which it transmits. The satellites 12 (FIG. 1) may contain a list of valid access codes which will allow it to determine whether the data is authorized to be routed through the system.

Use of access codes may also stop another potential system abuse. Each SU 26 (FIG. 1) may transmit header information containing its own unique access code. System users who have lost their authorization to use the system (e.g., for failure to pay their subscriber fees) may be barred by the satellites 12 (FIG. 1) from accessing the system.

Besides access codes, header information may additionally include the destination address of the data (for node-to-node routing determinations), the access priority of the system node transmitting the data (for determining whether that access priority is being serviced by the cell), the geographical location of the system node transmitting the data, etc.

Thus, an improved cellular network resource management method and apparatus has been described which overcomes specific problems and accomplishes certain advantages relative to prior art methods and mechanisms. The improvements over known technology are significant. The misuse of resources is avoided and system performance is enhanced. Resource management plans are more readily and rapidly calculated.

The foregoing description of the specific embodiments will so fully reveal the general nature of the invention that others can, by applying current knowledge, readily modify and/or adapt for various applications such specific embodiments without departing from the generic concept and therefore such adaptations and modifications should and are intended to be comprehended within the meaning and range of equivalents of the disclosed embodiments. In particular, while the preferred embodiment has been described in terms of a satellite cellular telecommunications system and method, those of skill in the art will understand based on the description herein that the means and method of the present invention are not limited just to satellite cellular networks but apply equally well to other types of multi-nodal telecommunications systems whose resource management in individual nodes is important, as for example, but not limited to, terrestrial cellular and micro cellular systems.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for operating a satellite cellular communication system having multiple satellites, at least some of which are moving with respect to a surface of a celestial body, each of the satellites containing communication resources including transmitters and receivers communicating with multiple ground terminals and at least one controlling station, comprising:

a) forecasting by a first computer, communication traffic expected to pass between the ground terminals and the satellites and operating capabilities of the satellites, during a future predetermined period;

b) determining from the communication traffic and the operating capabilities, an individual operational plan for each of the satellites for managing resources on the satellites to accommodate the forecasted communication traffic during the future predetermined period;

c) transmitting to and storing within each of the satellites the individual operational plan for each of the satellites; and d) energizing the transmitters and the receivers of each of the satellites according to the individual operational plan stored within each of the satellites in response to actual communication traffic demands during the future predetermined period.

2. The method of claim 1 wherein said forecasting step further comprises forecasting communication traffic expected to pass between the satellites during the future predetermined period.

3. The method of claim 1 wherein said determining step includes generating tables having decisional information used by each of the satellites to adaptively modify a satellite's mode of operation during the future predetermined period based on the actual communication traffic demands and actual satellite operating capabilities during the future predetermined period, said tables comprising a part of the individual operational plan.

4. The method of claim 1 wherein said determining step comprises creating one or more sub-plans for managing each managed satellite resource, each of said sub-plans comprising an execution plan and a timed update plan, the timed update plan modifying the execution plan at pre-planned times during the future predetermined period, said sub-plans comprising a part of the individual operational plan.

5. The method of claim 1 wherein said determining step comprises determining the individual operational plan using predetermined planning constraints affecting system operation.

6. The method of claim 5 wherein said determining step comprises determining the individual operational plan using the predetermined planning constraints at least some of which vary with a satellite location above the celestial body.

7. The method of claim 1 wherein said forecasting and determining steps are performed by the at least one controlling station, the method further comprising steps of, monitoring execution of the individual operational plan within each of the satellites in response to actual operations to detect out-of-plan conditions, and when the out-of-plan conditions reach or exceed predetermined thresholds, transmitting an indication of the out-of-plan condition to the at least one controlling station.

8. The method of claim 7 wherein said storing step comprises storing the predetermined thresholds within the satellites.

9. The method of claim 7 wherein said monitoring step comprises determining when the actual operations reach a predetermined threshold, and wherein the method further comprises a step of modifying a satellite's mode of operation so as not to exceed the predetermined threshold when said determining step determines that the actual operations have reached the predetermined threshold.

10. The method of claim 7 further comprising repeating steps a)–c) to provide an updated operational plan for at least a satellite reporting the out-of-plan condition, so as to relieve the out-of-plan condition.

11. The method of claim 10 wherein a first occurrence of step a) is based upon initial historical data and the out-of-plan condition is reported prior to an end of the future predetermined period, and a second occurrence of step a) is based on the initial historical data and the out-of-plan condition, and the second occurrence of step a) forecasts for a balance of the future predetermined period.

12. The method of claim 10 wherein a first occurrence of step a) is based upon initial historical data up to a beginning of the future predetermined period and the out-of-plan condition is reported prior to an end of the future predetermined period, and a second occurrence of step a) is based on new historical data comprising the initial historical data updated to a then current time and the out-of-plan condition, and the second occurrence of step a) forecasts for a balance of the future predetermined period.

13. The method of claim 10 wherein a first occurrence of step a) is based upon initial historical data and the out-of-plan condition is reported prior to an end of the future predetermined period, and a second occurrence of step a) is based on the initial historical data and the out-of-plan condition, and the second occurrence of step a) forecasts for a further period extending beyond the future predetermined period.

14. The method of claim 10 wherein a first occurrence of step a) is based upon initial historical data up to a beginning of the future predetermined period and the out-of-plan condition is reported prior to an end of the future predetermined period, and a second occurrence of step a) is based on new historical data comprising the initial historical data up-dated to a then current time and the out-of-plan condition, and the second occurrence of step a) forecasts for a further period extending beyond the future predetermined period.

15. The method of claim 1 wherein said forecasting and determining steps are performed by the at least one controlling station, and the method further comprises the steps of, monitoring within each of the satellites a status of available resources and satellite functionality, and transmitting said status and said satellite functionality to the at least one controlling station.

16. The method of claim 15 further comprising steps of evaluating the status and the satellite functionality to determine whether the status and the satellite functionality indicate that a future out-of-plan condition will occur within the future predetermined period, and when the status and the satellite functionality indicate that the future out-of-plan condition will occur within the future predetermined period, repeating steps a)–c) to provide an updated operational plan for at least a particular satellite reporting the status and the satellite functionality, so as to at least partially avoid the future out-of-plan condition.

17. The method of claim 1 wherein during the future predetermined period, steps a)–c) are repeated for a further period, wherein step a) is based on historical data up-dated to a then current time.

18. The method of claim 1 wherein a particular satellite further comprises one or more devices for receiving and transmitting electromagnetic energy for projecting one or more communication cells onto the surface of the celestial body, and wherein individual ground terminals located within the one or more communication cells of the particular satellite are capable of communicating with the particular satellite using multiplexed or non-multiplexed signalling channels, and wherein the determining step further comprises generating cell assignment tables having channel assignments for each of the one or more communication cells, wherein the channel assignments include information which the particular satellite will use to control operation of the one or more devices for receiving and transmitting during the future predetermined period, said cell assignment tables comprising a part of the individual operational plan.

19. The method of claim 18 wherein said determining step includes generating additional channel tables having additional channel assignments which may be allocated to a particular communication cell during the future predetermined period, based on the actual communication traffic demands in the particular communication cell, said additional channel tables comprising another part of the individual operational plan.

20. The method of claim 18 wherein said determining step comprises creating one or more sub-plans for managed satellite resources, each of the sub-plans comprising an execution plan and a timed update plan, the timed update plan modifying the execution plan at pre-planned times during the future predetermined period, said sub-plans comprising another part of the individual operational plan.

21. The method of claim 18 wherein said determining step includes generating location tables having predetermined geographical locations of a center of said one or more communication cells which the particular satellite broadcasts to the individual ground terminals, said location tables comprising another part of the individual operational plan.

22. The method of claim 18 wherein the individual ground terminals are previously assigned access priority values which are stored in the individual ground terminals and which indicate to a particular ground terminal that the particular ground terminal may access the satellite cellular communication system when the particular satellite is allowing access to a group of the individual ground terminals with the access priority values matching one or more predetermined access priority values stored in the particular satellite, and wherein said determining step includes generating tables having the one or more predetermined access priority values for each of the one or more communication cells within the particular satellite, said tables comprising another part of the individual operational plan.

23. The method of claim 18 wherein said determining step includes generating link tables having information used by the particular satellite to establish a communication link between the particular satellite and a particular individual ground terminal, said link tables comprising another part of the individual operational plan.

24. The method of claim 23 wherein said determining step further includes generating other information said particular satellite uses to slew the one or more devices for receiving and transmitting electromagnetic energy toward the particular individual ground terminal, the other information comprising a particular part of the link tables.

25. The method of claim 1 wherein said determining step occurs at least in part in an earth-based controlling station.

26. The method of claim 1 wherein a particular satellite further comprises one or more cross-link devices for receiving and transmitting electromagnetic energy for communicating with one or more neighbor satellites, and wherein each of the one or more cross-link devices is coupled to a cross-link transmitter and a cross-link receiver, and wherein said determining step comprises generating tables having routing information which tells the particular satellite to which of the one or more neighbor satellites to route a message intended for another satellite using one of the one or more cross-link devices, said tables comprising a part of the individual operational plan.

27. The method of claim 26 wherein said transmitting step includes transmitting a particular future individual operational plan intended for a first satellite from the controlling station to a second satellite wherein the transmitting step further comprises a step of routing the particular future individual operational plan by the second satellite to the first satellite according to the routing information stored in the second satellite.

28. The method of claim 1 wherein said transmitting step includes transmitting said individual operational plan intended for a first satellite from the controlling station to the first satellite when the first satellite establishes communications with the controlling station.

29. The method of claim 1 wherein said satellites further comprise at least one device for receiving and transmitting electromagnetic energy for communicating with any of multiple nearest neighbor satellites, and the determining and transmitting steps comprise determining and transmitting the individual operational plan comprising information by which an individual satellite receiving a message intended to be passed to a further satellite can determine to which of the multiple neighbor satellites the message should be passed so as to be relayed to the further satellite, and further comprising a step of energizing the at least one device for receiving and transmitting electromagnetic energy to transmit said message to a particular neighbor satellite so determined.

30. A method for operating a satellite cellular communication system having multiple satellites, at least some of which are moving with respect to a surface of a celestial body, each of the multiple satellites comprising transmitters and receivers and one or more down-link devices for receiving and transmitting electromagnetic energy, coupled to the transmitters and the receivers, for projecting one or more communication cells onto the surface of the celestial body, the satellites communicating with at least one controlling station and multiple ground terminals having one or more up-link devices for receiving and transmitting electromagnetic energy for communicating with the multiple satellites, said method comprising:

a) forecasting by a first computer, communication traffic expected to pass between the ground terminals and the satellites and operating capabilities of the satellites, during a future predetermined period;

b) determining from the communication traffic and the operating capabilities, an individual operational plan for each of the satellites to accommodate the forecasted communication traffic during the future predetermined period;

c) transmitting to and storing within each of the satellites the individual operational plan for each of the satellites; and d) energizing the transmitters and the receivers of the satellites according to the individual operational plan in response to actual traffic demands during the future predetermined period.

31. The method of claim 30 wherein said determining step b) comprises:

b.1) forecasting forecasted system overhead traffic expected to pass between the ground terminals and the satellites during said future predetermined period;

b.2) selecting planning constraints which set limits on usage of the satellite cellular communication system;

b.3) determining, based on the forecasted communication traffic and the planning constraints, which of said one or more communication cells will be active or inactive during said future predetermined period;

b.4) for active communication cells, assigning one or more channels to the active communication cells;

b.5) selecting a strategy of routing the forecasted communication traffic and the forecasted system overhead traffic throughout the satellite cellular communication system based on results of the assigning step b.4);

b.6) determining whether the strategy accommodates the forecasted communication traffic and the forecasted system overhead traffic;

b.7) when the strategy does not accommodate the forecasted communication traffic and the forecasted system overhead traffic, selecting different planning constraints, and repeating steps b.3)–b.6); and b.8) when the strategy accommodates the forecasted communication traffic and the forecasted system overhead traffic, developing the individual operational plan for each of the satellites, the individual operational plan comprising information which the satellites require to route data and activate said one or more communication cells in accordance with the strategy.

32. The method of claim 31 wherein the satellites further comprise one or more cross-link devices for receiving and transmitting electromagnetic energy for communicating with neighbor satellites and said determining step b) further comprises a step prior to step b.5) of planning how said one or more cross-link devices for receiving and transmitting electromagnetic energy will be used to accommodate the forecasted communication traffic and the forecasted system overhead traffic.

33. The method of claim 31 wherein said step b.3 of determining which of said one or more communication cells will be active comprises:

b.3.a) selecting a particular strategy of activating the one or more communication cells;

b.3.b) determining, based on the particular strategy of activating the communication cells, how many channels each of the one or more communication cells would require to accommodate the forecasted communication traffic;

b.3.c) allocating channels to each of the one or more communication cells based on a determination made in step b.3.b);

b.3.d) predicting an energy consumed by the satellites during the future predetermined period based on the channels allocated to each of the one or more communication cells;

b.3.e) predicting an energy available to the satellites during the future predetermined period;

b.3.f) comparing a prediction of the energy consumed with a prediction of the energy available during the future predetermined period;

b.3.g) when, during any portion of the future predetermined period, the prediction of the energy consumed will exceed the prediction of the energy available, selecting a different strategy of activating the one or more communication cells;

b.3.h) repeating steps b.3.b) through b.3.g) until a comparison between the prediction of the energy consumed and the prediction of the energy available during the future predetermined period yields a minimal difference between the prediction of the energy consumed and the prediction of the energy available; and b.3.i) indicating which of said one or more communication cells will be active based on a final iteration of step b.3.h).

34. The method of claim 31 wherein said step b.5) of selecting the strategy of routing comprises:

b.5.a) choosing a routing strategy to accommodate the forecasted communication traffic and the forecasted system overhead traffic for the future predetermined period;

b.5.b) predicting, based on the routing strategy, predicted quantities of link traffic which will occur on cross-links and down-links;

b.5.c) comparing the predicted quantities of the link traffic with available capacities on the cross-links and the down-links during the future predetermined period;

b.5.d) when, during any portion of the future predetermined period, actual quantities of the link traffic exceed the available capacities on the cross-links and the down-links, selecting a revised routing strategy;

b.5.e) repeating steps b.5.b) through b.5.d) until a comparison between the quantities of the link traffic and the available capacities during the future predetermined period yields a minimal difference between the quantities of the link traffic and the available capacities; and b.5.f) selecting the strategy of routing based on a final iteration of step b.5.e).

35. A cellular communication system, comprising:

multiple satellites, wherein at least one of the multiple satellites moves with respect to a surface of a celestial body, each satellite containing communication resources including one or more transmitters and one or more receivers for providing communication with at least one ground terminal, one of more receiving devices coupled to said one or more receivers, and one or more transmitting devices coupled to said one or more transmitters;

a satellite resident memory containing an individual operational plan that is based on forecasts of communication traffic expected to be received by the satellites, and operating capabilities of the satellites during a future predetermined period, said individual operational plan being provided to said satellites by a controlling station, said individual operational plan for operating the satellite for the future predetermined period, and causing the satellite to change a satellite's mode of operation at predetermined times during the future predetermined period; and a satellite resident controller coupled to the satellite resident memory, the one or more transmitters, and the one or more receivers, the satellite resident controller for actuating the one or more transmitters and the one or more receivers in accordance with communication traffic passing through the satellites in a manner determined by the individual operational plan.

36. The system of claim 35 further comprising:

at least one controlling station for forecasting the communication traffic expected to pass between neighbor satellites, forecasting the communication traffic expected to pass between the satellites and the at least one ground terminal, and forecasting operating capabilities of the satellites during the future predetermined period, wherein said at least one controlling station provides said individual operational plan for each satellite suitable to acceptably accommodate the forecasted communication traffic during the future predetermined period within constraints imposed by the operating capabilities of the satellites; and a transmitter associated with the at least one controlling station for transmitting said individual operational plan to said satellites for storage in said satellite resident memory.

37. The system of claim 36 wherein the satellite resident controller determines a status of satellite resources and satellite functionality and transmits the status and the satellite functionality to said at least one controlling station.

38. The system of claim 37 wherein when said at least one controlling station determines from said status and said satellite functionality that a future out-of-plan condition will probably occur when the individual operational plan continues to be executed by a satellite reporting the status and the satellite functionality, and said controlling station provides an up-dated operational plan for at least the satellite reporting the status and the satellite functionality, so as to at least partially avoid the future out-of-plan condition.

39. The system of claim 36 wherein said at least one controlling station compares expected energy consumption within a satellite in response to the forecasted communication traffic through said satellite during the future predetermined period with expected energy generation during the future predetermined period and adjusts the individual operational plan for said satellite so that any projected energy deficit is removed.

40. The system of claim 36 wherein each satellite further comprises one or more cellular transmitters and receivers for projecting one or more communication cells onto the surface of the celestial body, and wherein a particular satellite communicates with individual ground terminals located within the one or more communication cells of the particular satellite using assigned channels, and the at least one controlling station generates the individual operational plan for each satellite having a table wherein channel assignments for each communication cell are included, the channel assignments controlling operation of the cellular transmitters and receivers associated with each communication cell during the future predetermined period.

41. The system of claim 40 wherein the satellites further comprise one or more receiving and transmitting devices for communicating with any of multiple neighbor satellites, and the individual operational plan for each satellite comprises information by which a satellite, receiving a message intended to be passed to a further satellite, can determine to which of the multiple neighbor satellites the message should be passed so as to be relayed to the further satellite.

42. The system of claim 41 wherein said at least one controlling station creates the individual operational plan comprising one or more operational sub-plans for managing each managed satellite resource, each of said operational sub-plans comprising an execution plan and a timed update plan, the timed update plan modifying the execution plan at pre-planned times during the future predetermined period.

43. The system of claim 42 wherein said at least one controlling station creates a first operational sub-plan including a routing sub-plan with which the satellite receiving the message intended to be passed to the further satellite can determine to which of the multiple neighbor satellites the message should be passed so as to be relayed to the further satellite.

44. The system of claim 42 wherein said at least one controlling station creates a second operational sub-plan including a location area code sub-plan containing geographical information indicating a center location of each particular communication cell which a satellite broadcasts to ground terminals located in each particular communication cell.

45. The system of claim 42 wherein said at least one controlling station creates a third operational sub-plan including an access priority sub-plan containing information identifying access priority numbers for each particular communication cell which the satellite will service, this information being broadcast to ground terminals within each particular communication cell such that a ground terminal within the particular cell not having said access priority numbers which the satellite will service may decide to not attempt to communicate with said satellite.

46. The system of claim 42 wherein said at least one controlling station creates a fourth operational sub-plan including an access channel sub-plan containing information identifying access channel numbers for each communication cell within a particular satellite which a ground terminal within a particular communication cell should use to access the particular satellite, this information being broadcast to ground terminals within the particular communication cell.

47. The system of claim 42 wherein said at least one controlling station creates a fifth operational sub-plan including a cell activation sub-plan which a particular satellite uses to determine when to turn each particular communication cell on or off and what particular channels to use in each particular communication cell.

48. The system of claim 42 wherein said at least one controlling station creates a sixth operational sub-plan including a cell additional channel sub-plan containing additional channel assignments which are assigned to a particular communication cell based on actual traffic demand during actual operations.

49. The system of claim 42 wherein said at least one controlling station creates a seventh operational sub-plan including a satellite-to-ground terminal link assignment sub-plan containing information that a particular satellite uses to establish a communication link with a particular ground terminal.

50. The system of claim 42 wherein said at least one controlling station creates an eighth operational sub-plan including a cross-link assignment sub-plan containing information that a particular satellite uses to establish a communication link with a particular neighbor satellite.

51. The system of claim 36 wherein said at least one controlling station creates an overall system operational plan, parses said overall system operational plan into resource sub-plans for each satellite resource to be managed, and parses resource sub-plans into the individual operational plans for each satellite.

52. The system of claim 36 wherein said at least one controlling station creates an overall system operational plan, parses the overall system operational plan into satellite sub-plans for each satellite, and parses said satellite sub-plans into the individual operational plans for each satellite resource to be managed.

53. The system of claim 35 wherein said satellite resident memory contains the individual operational plan comprising an execution plan and a timed update plan, the timed update plan modifying the execution plan at pre-planned times.

54. The system of claim 53 wherein said timed update plan in said satellite resident memory is loaded into said satellites after insertion of said satellites into orbit.

55. The system of claim 36 wherein the satellite resident controller further monitors execution of the individual operational plan within each satellite in response to actual traffic demand to detect an out-of-plan condition; and when such out-of-plan condition exceed a predetermined threshold, actuates one of said one or more transmitters to transmit an indication of such out-of-plan condition to said controlling station.

56. The system of claim 55 wherein said at least one controlling station provides an up-dated operational plan for at least a satellite reporting the out-of-plan condition, so as to at least partially relieve the out-of-plan condition.

57. The system of claim 56 wherein said at least one controlling station provides a first operational plan based on initial historical data and the out-of-plan condition is reported by the satellite reporting the out-of-plan condition prior to an end of the future predetermined period, and said at least one controlling station provides the up-dated operational plan for a balance of the future predetermined period based on the initial historical data and the out-of-plan condition.

58. The system of claim 57 wherein said at least one controlling station forecasts the up-dated operational plan for a balance of the future predetermined period based the initial historical data, the out-of-plan condition and new historical data up-dated to a then current time.

59. The system of claim 56 wherein said at least one controlling station provides a first operational plan based on initial historical data up to a beginning of the future predetermined period and the out-of-plan condition is reported by the satellite reporting the out-of-plan condition prior to an end of the future predetermined period, and said at least one controlling station provides the up-dated operational plan for a further period different from the future predetermined period based on the initial historical data and the out-of-plan condition.

60. The system of claim 59 wherein said at least one controlling station forecasts the up-dated operational plan for a further period different from the future predetermined period based on the initial historical data, the out-of-plan condition and new historical data up-dated to a then current time.

61. A communication system of multiple satellites for placement in non-geosynchronous orbit around a celestial body, comprising satellite resources including:

one or more transmitters and receivers in the satellites for providing communication with multiple ground terminals including individual cellular radios;

one or more devices for receiving and transmitting electromagnetic energy on the satellites, coupled to the one or more transmitters and receivers;

satellite resident memory containing an individual operational plan provided to said satellites by a separate controlling station, said individual operational plan for operating each satellite for a predetermined future period, said individual operational plan being loadable into said satellite resident memory after the satellite is in orbit;

satellite resident controller coupled to the satellite resident memory and the one or more transmitters and receivers for actuating the one or more transmitters and receivers in accordance with communication traffic passing through the satellites in a manner determined by the individual operational plan stored in the satellite resident memory, wherein said individual operational plan in the satellite resident memory comprises tables having entries providing different operational rules for the satellite which vary with an orbital location of the satellite relative to the celestial body, said operational rules comprising communication channel parameters used by the transmitters and receivers on the satellite in order to transmit and receive first messages from ground terminals within a coverage footprint of at least one of the devices for receiving and transmitting electromagnetic energy.

62. The system of claim 61 wherein said individual operational plan in said satellite resident memory comprises a resource sub-plan for each managed satellite resource, each of said resource sub-plans comprising an execution plan and a timed update plan, the timed update plan modifying the execution plan at pre-planned times.

63. The system of claim 61 wherein said one or more transmitters and receivers in the satellites provides communication between neighbor satellites and the satellites further comprise at least a second device for receiving and transmitting electromagnetic energy coupled to the one or more transmitters and receivers wherein said operational rules in said satellite resident memory include routing information used by the transmitters and receivers on the satellite to exchange second messages with a particular neighbor satellite using the at least the second device for receiving and transmitting electromagnetic energy so as to route the second messages intended for a non-neighbor satellite to the particular neighbor satellite along a pre-planned route for such second messages.

64. The system of claim 63 wherein said separate controlling station comprises at least a third device for receiving and transmitting electromagnetic energy for transmitting said individual operational plan to said satellites, wherein said individual operational plan is loadable within a particular satellite when any of said satellites is capable of establishing communications with said separate controlling station and said individual operational plan is routed along the pre-planned route to said particular satellite.

65. The system of claim 61 wherein said coverage footprint comprises one or more communication cells projected onto a surface of the celestial body by the satellite.

66. The system of claim 65 wherein said operational rules in said satellite resident memory further comprise information used by the one or more transmitters on the satellite to broadcast geographical locations of a center of said communication cells to said multiple ground terminals.

67. The system of claim 65 wherein each of said multiple ground terminals are previously assigned access priority values which allow each of said multiple ground terminals to communicate with a particular satellite when the particular satellite is servicing said previously assigned access priority values and said operational rules further comprise which access priority values the particular satellite will service within each of said communication cells.

68. The system of claim 65 wherein said communication cells of said satellites are previously assigned multiple communication channels and said operational rules further comprise which of the multiple communication channels are assigned to each communication cell.

69. The system of claim 61 wherein said operational rules in said satellite resident memory further comprise information used by said satellite resident controller to establish a communication link between a particular satellite and a particular ground terminal.

70. The system of claim 69 wherein said information used by said satellite resident controller comprises information said satellite resident controller uses to slew said one or more devices for receiving and transmitting electromagnetic energy toward the particular ground terminal.

71. The system of claim 61 wherein said separate controlling station comprises at least a fourth device for receiving and transmitting electromagnetic energy for transmitting information to said satellites.

72. The system of claim 71 wherein said separate controlling station may provide said individual operational plan to a particular satellite by transmitting said individual operational plan to said particular satellite using at least the fourth device for receiving and transmitting electromagnetic energy when said particular satellite is oriented in space such that said particular satellite is capable of establishing communications with said separate controlling station.

73. The system of claim 71 wherein said separate controlling station may provide said individual operational plan to a particular satellite by transmitting said individual operational plan to any one of said satellites using at least the fourth device for receiving and transmitting electromagnetic energy when said any one of said satellites is capable of establishing communications with said separate controlling station and said individual operational plan is routed along a pre-planned route of neighbor satellites to said particular satellite.

* * * * *